United States Patent
Lee et al.

(10) Patent No.: US 12,442,543 B2
(45) Date of Patent: Oct. 14, 2025

(54) CEILING TYPE INDOOR UNIT OF AIR CONDITIONER

(71) Applicant: LG ELECTRONICS INC., Seoul (KR)

(72) Inventors: Miyoung Lee, Seoul (KR); Kidong Kim, Seoul (KR); Jaehyeon Kim, Seoul (KR); Seokho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 644 days.

(21) Appl. No.: 17/908,613

(22) PCT Filed: Mar. 2, 2021

(86) PCT No.: PCT/KR2021/002527
§ 371 (c)(1),
(2) Date: Sep. 1, 2022

(87) PCT Pub. No.: WO2021/177684
PCT Pub. Date: Sep. 10, 2021

(65) Prior Publication Data
US 2023/0124307 A1    Apr. 20, 2023

(30) Foreign Application Priority Data
Mar. 2, 2020 (KR) .................. 10-2020-0026214

(51) Int. Cl.
*F24F 1/0047* (2019.01)
(52) U.S. Cl.
CPC .................. *F24F 1/0047* (2019.02)
(58) Field of Classification Search
CPC .......... F24F 1/0047; F24F 1/64; F24F 5/0092; F24F 7/10; F24F 13/0227; F24F 13/06;
(Continued)

(56) References Cited

U.S. PATENT DOCUMENTS

| 5,888,133 A * | 3/1999 | Mori | F24F 13/06 454/321 |
| 2002/0189274 A1* | 12/2002 | Lee | F24F 1/0083 62/262 |

(Continued)

FOREIGN PATENT DOCUMENTS

| CN | 104807081 | 7/2015 |
| CN | 106524463 | 3/2017 |

(Continued)

OTHER PUBLICATIONS

Chinese Office Action dated May 6, 2023 issued in Application No. 202180018653.0.

(Continued)

*Primary Examiner* — Avinash A Savani
*Assistant Examiner* — Ryan L Faulkner
(74) *Attorney, Agent, or Firm* — KED & ASSOCIATES

(57) ABSTRACT

A ceiling-type indoor unit of an air conditioner includes a case in which at least one discharge hole is formed; a first vane disposed at the at least one discharge hole; a vane motor coupled to the case and providing a drive force to the first vane; a drive link that is rotatably coupled to the case and coupled with the vane motor and transmits the drive force of the vane motor to the first vane; a first vane link rotatably coupled to the case and with the first vane; a support bracket coupled to the case and disposed at the at least one discharge hole; and a support link disposed between a first end and a second end in a longitudinal direction of the first vane, and rotatably coupled to the first vane and the support bracket.

22 Claims, 9 Drawing Sheets

(58) Field of Classification Search
CPC ........... F24F 2221/14; F24F 2013/1446; F24F 13/1413; F24F 13/142; F24F 13/1486; F24F 2203/1004
USPC .................................................. 454/254, 219
See application file for complete search history.

(56) References Cited

U.S. PATENT DOCUMENTS

| | | | |
|---|---|---|---|
| 2014/0308887 A1 | 10/2014 | Yoon et al. | |
| 2018/0313569 A1 | 11/2018 | Moon et al. | |
| 2018/0328599 A1 | 11/2018 | Lin et al. | |
| 2020/0191419 A1* | 6/2020 | Lee | F24F 1/0047 |
| 2020/0191420 A1* | 6/2020 | Lee | F24F 1/0047 |
| 2023/0204251 A1* | 6/2023 | Kim | F24F 13/1413 454/358 |
| 2023/0280047 A1* | 9/2023 | Lee | F24F 13/1426 454/284 |

FOREIGN PATENT DOCUMENTS

| | | |
|---|---|---|
| CN | 107014053 | 8/2017 |
| CN | 107631461 | 1/2018 |
| JP | H09-178260 | 7/1997 |
| KR | 10-2014-0123184 | 10/2014 |
| KR | 10-2015-0027382 | 3/2015 |
| KR | 10-2017-0080102 | 7/2017 |
| KR | 10-2018-0121161 | 11/2018 |
| KR | 10-2019-0024480 | 3/2019 |
| KR | 10-2019-0027335 | 3/2019 |
| KR | 10-2019-0027336 | 3/2019 |
| KR | 10-2019-0130846 | 11/2019 |
| WO | WO 2011/064999 | 6/2011 |

OTHER PUBLICATIONS

International Search Report dated Jul. 7, 2021 issued in Application No. PCT/KR2021/002527.
European Search Report issued in Application No. 21763779.2 dated Mar. 1, 2024.
Chinese Notice of Allowance dated Oct. 7, 2023 issued in Application No. 202180018653.0.
Japanese Office Action dated Oct. 24, 2023 issued in Application No. 2022-552328.
Korean Office Action issued in Application No. 10-2020-0026214 dated May 30, 2024.

* cited by examiner

[Fig. 1]
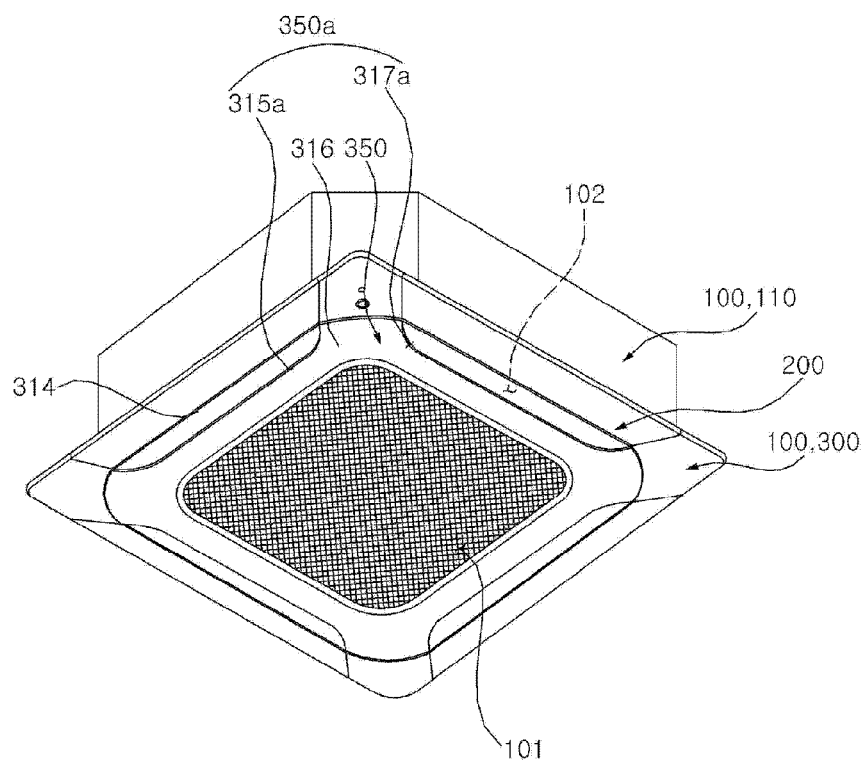
[Fig. 2]
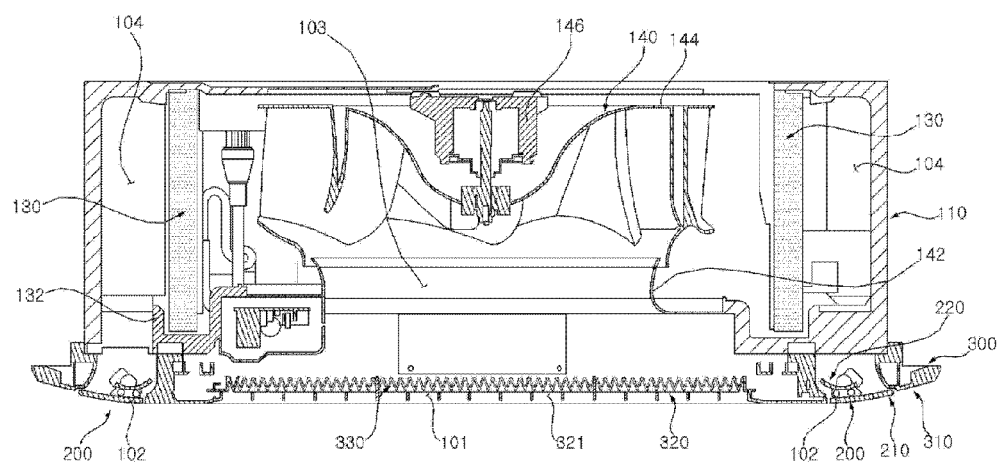

[Fig. 3]
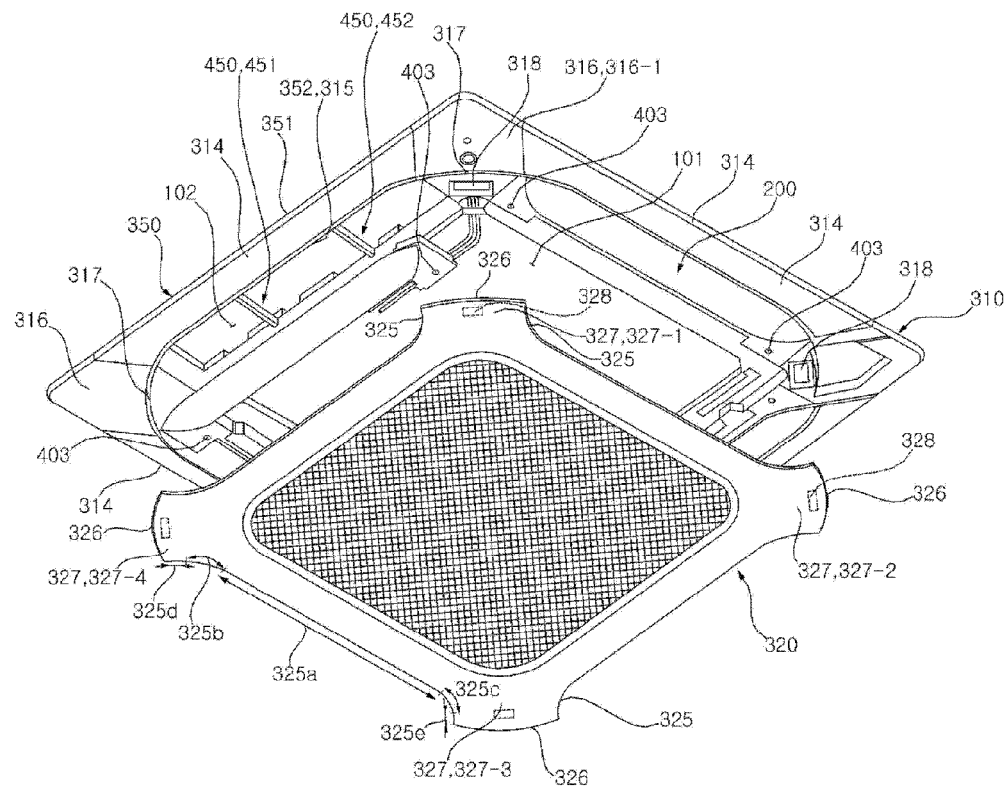
[Fig. 4]
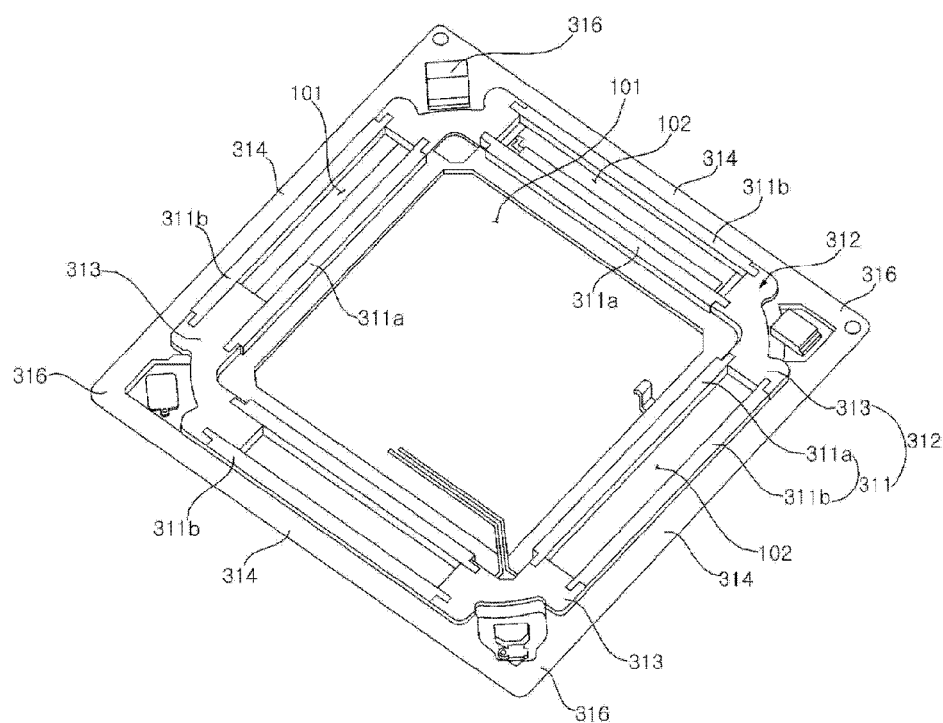

[Fig. 5]
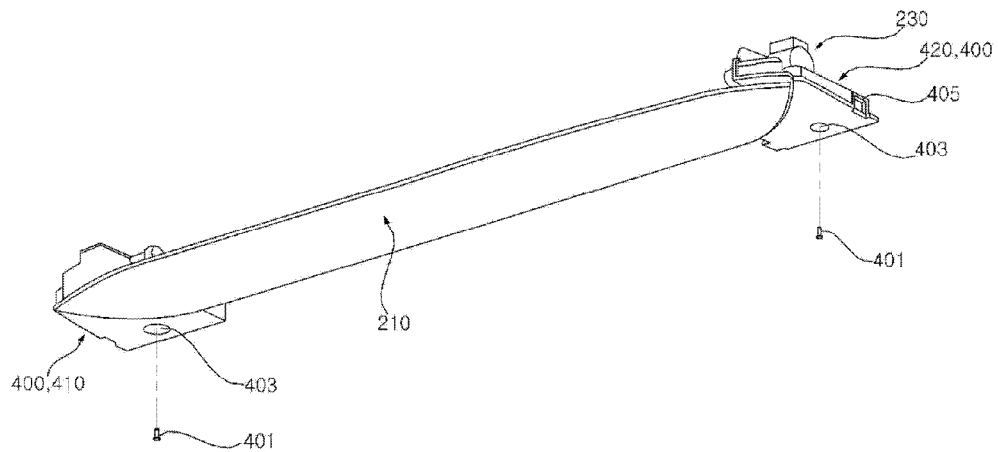
[Fig. 6]
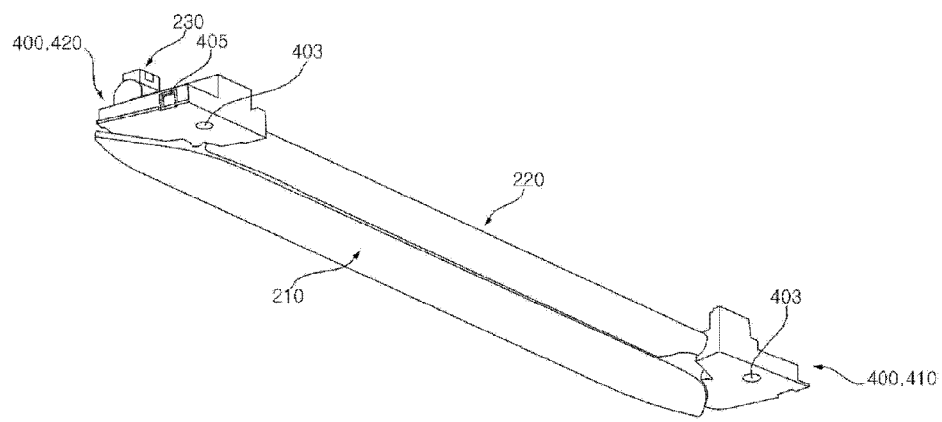
[Fig. 7]
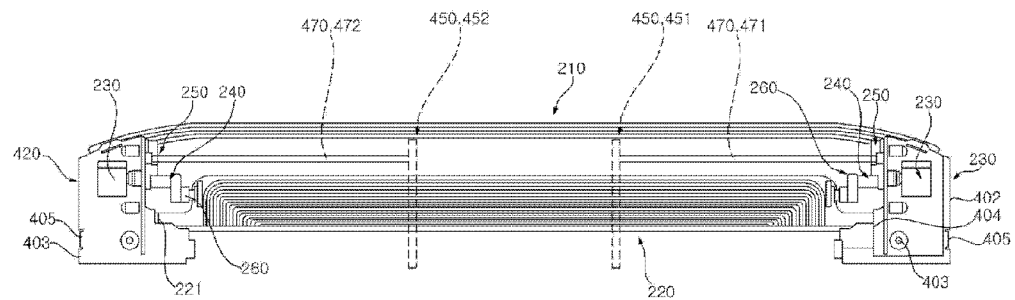

[Fig. 8]
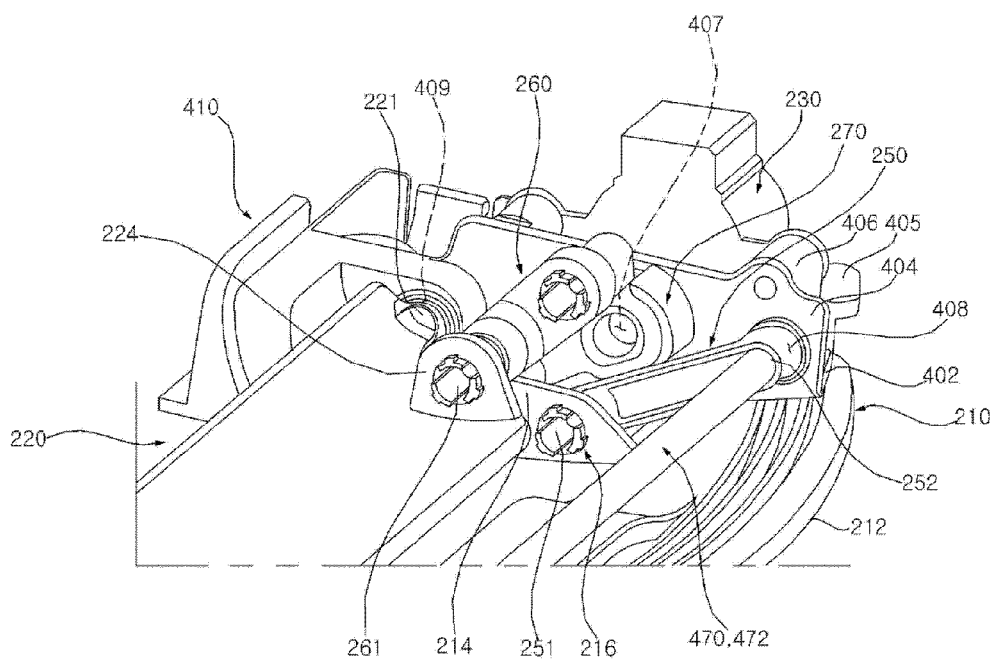
[Fig. 9]
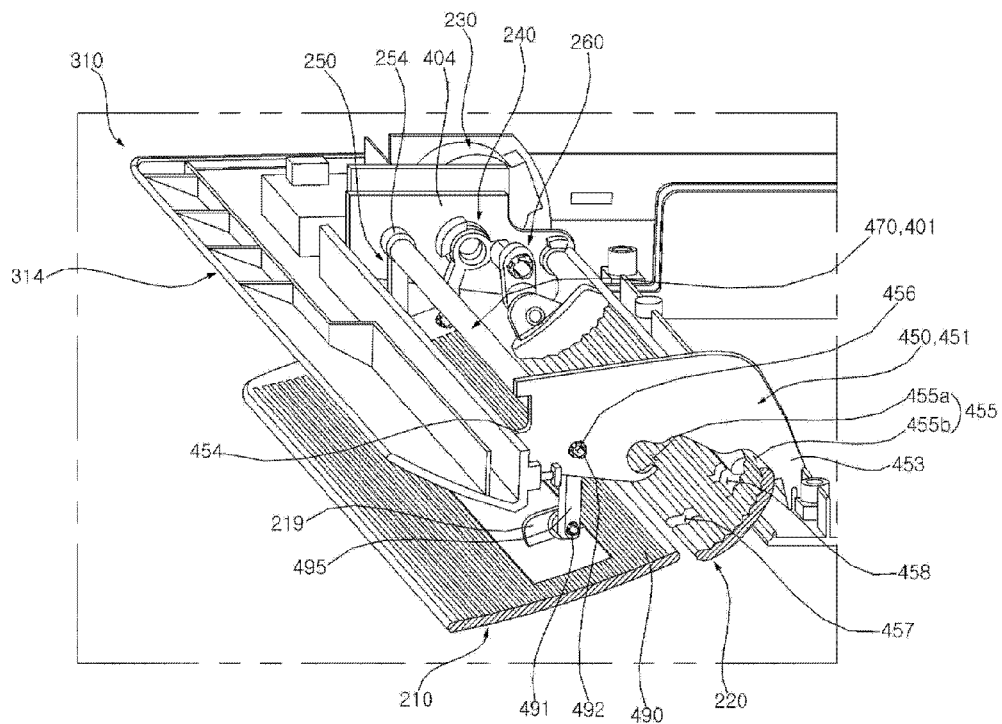

[Fig. 10]
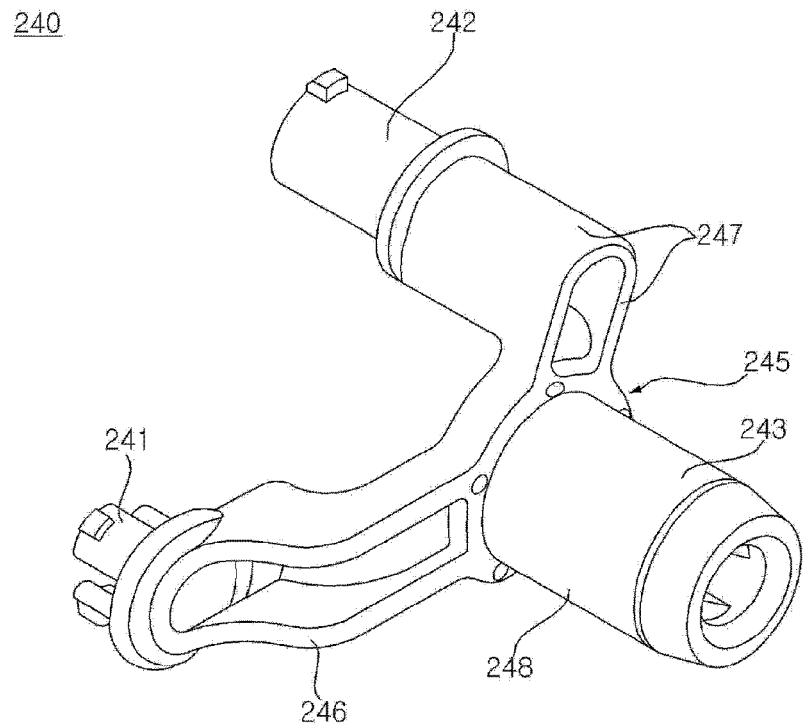
[Fig. 11]
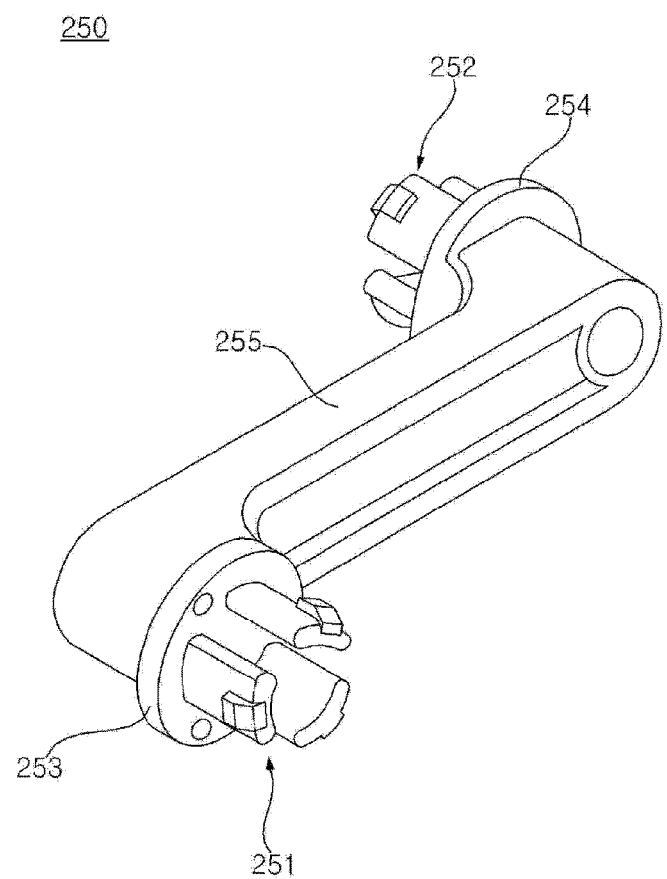

[Fig. 12]
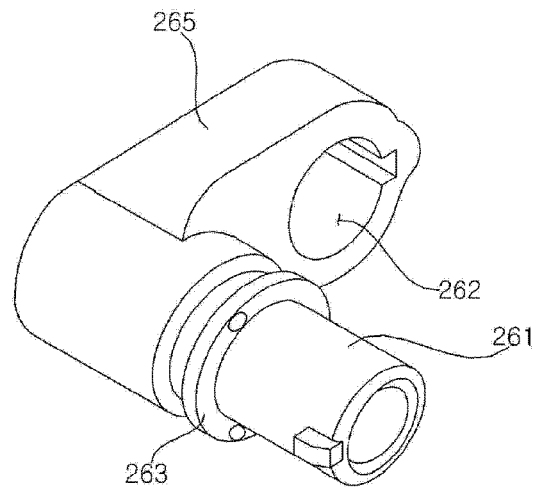
[Fig. 13]
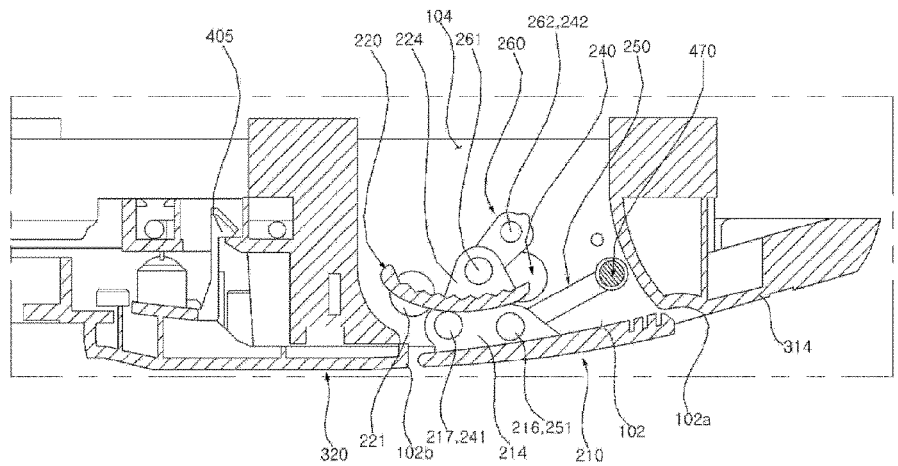
[Fig. 14]
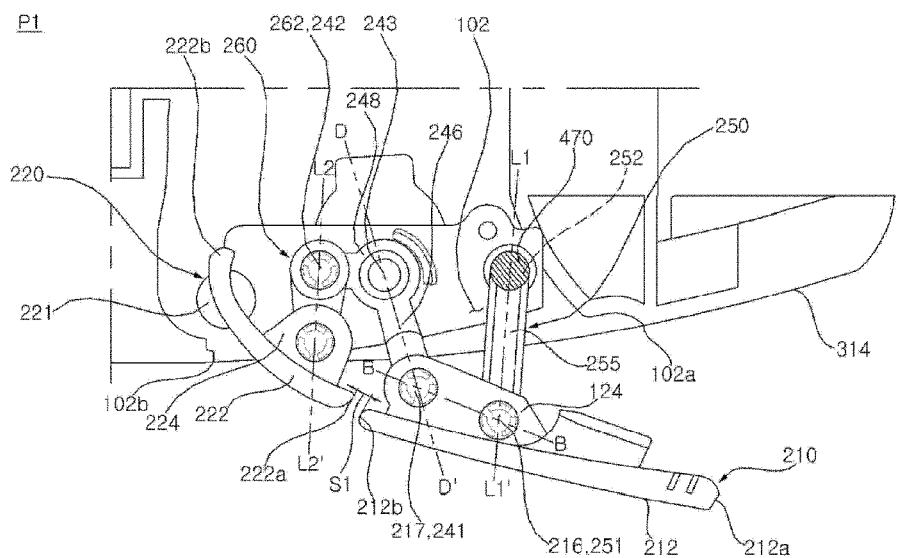

[Fig. 15]
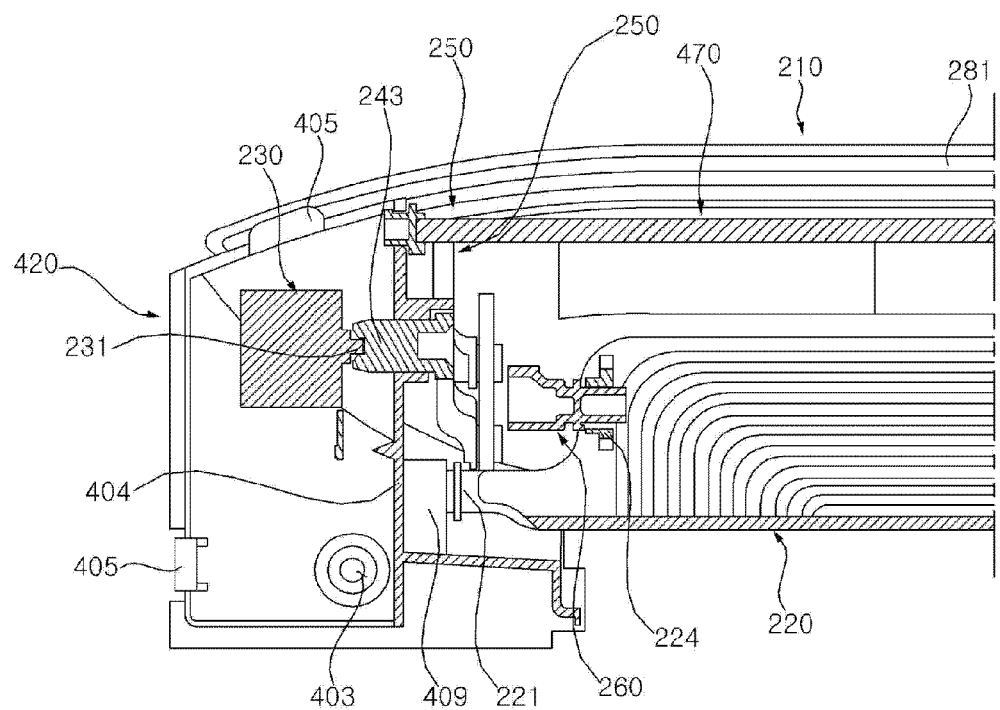
[Fig. 16]
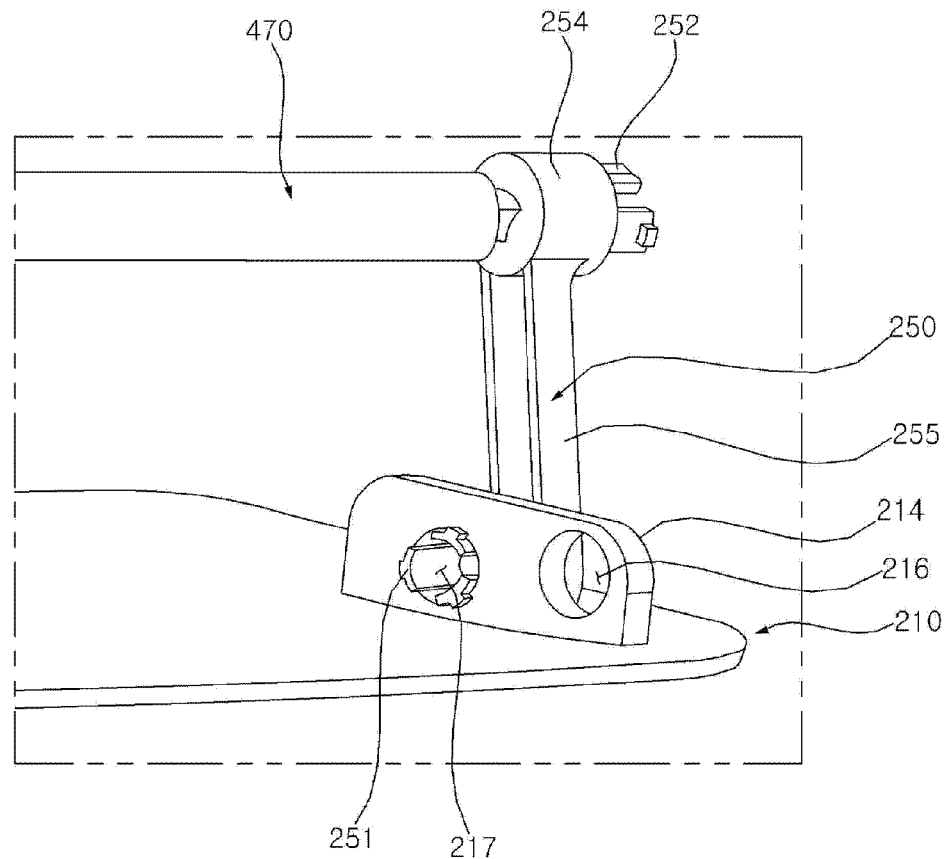

[Fig. 17]
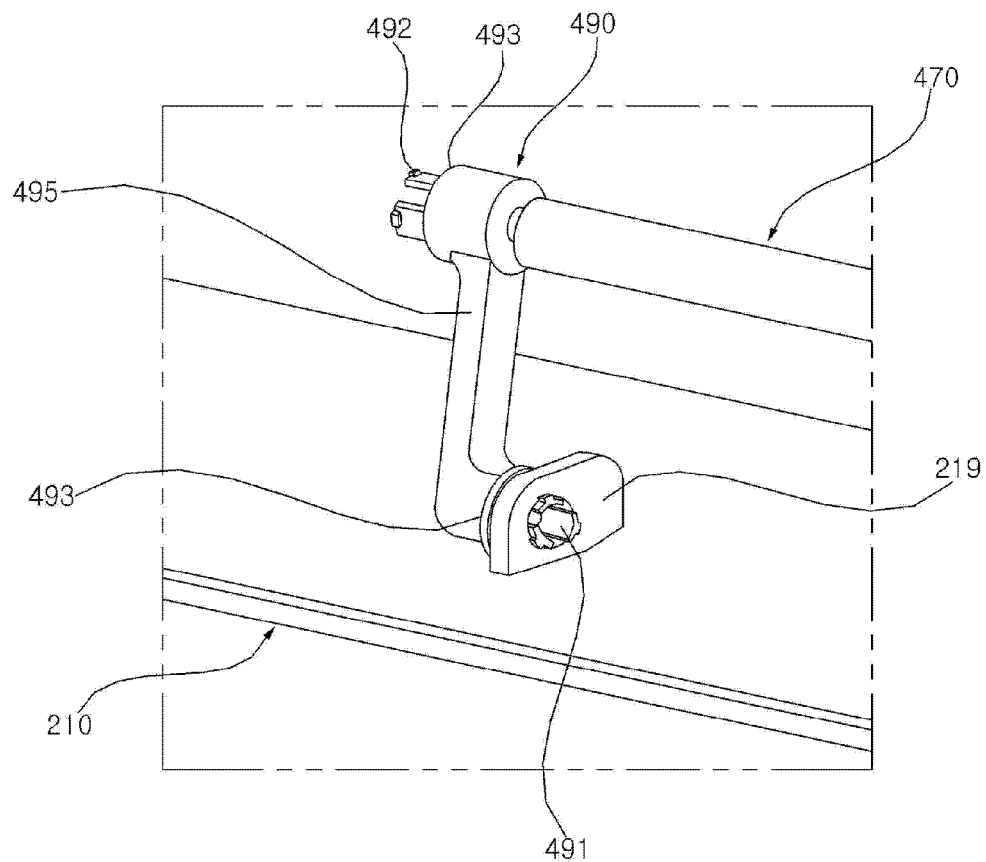
[Fig. 18]
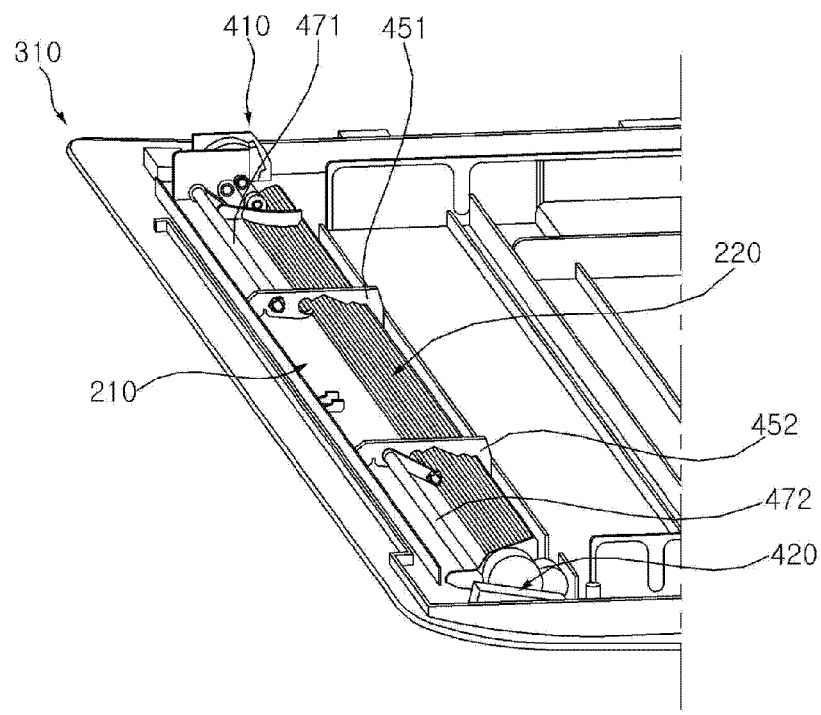

[Fig. 19]
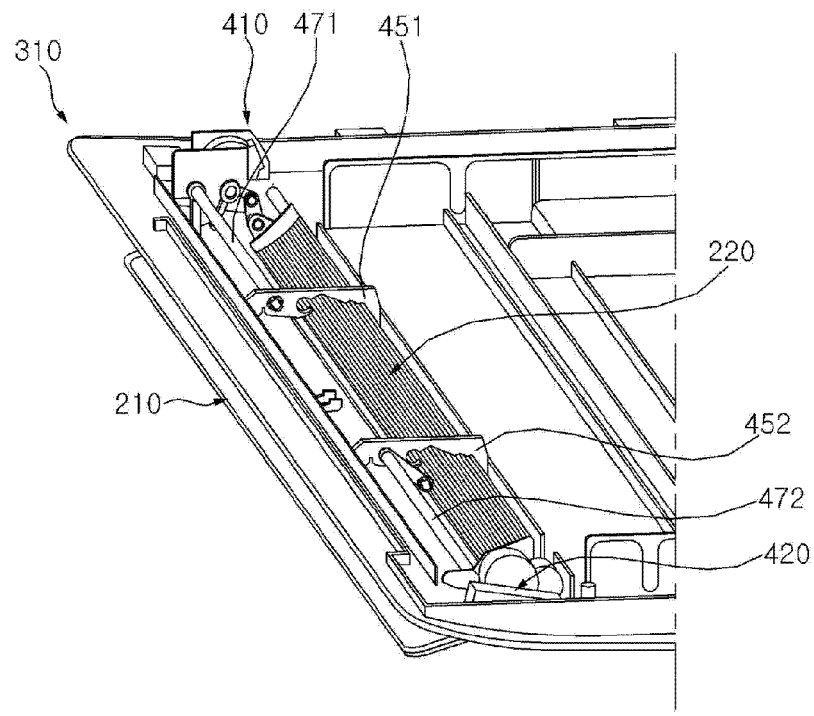
[Fig. 20]
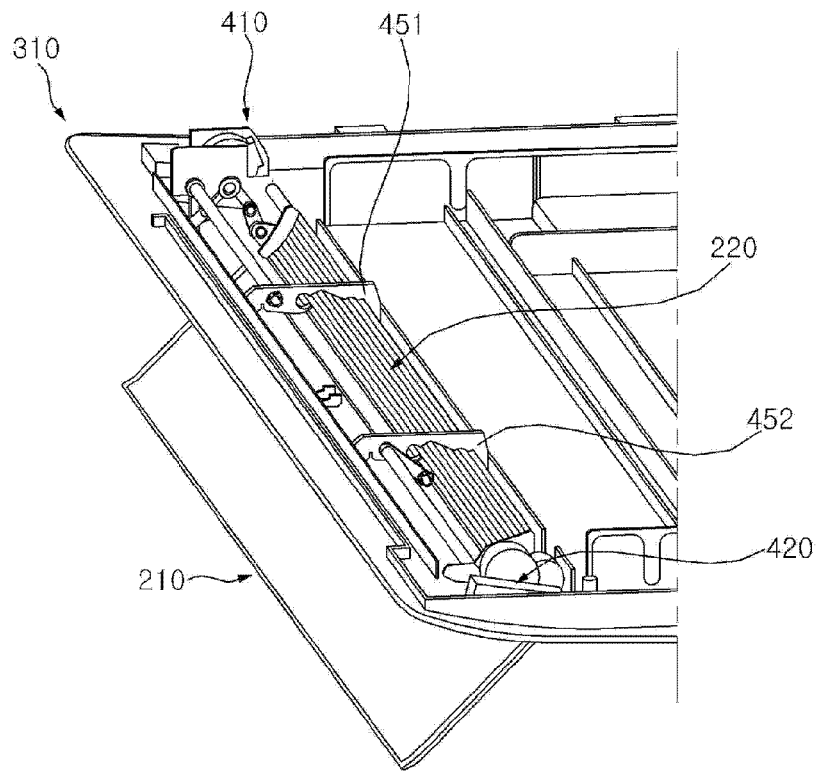

CEILING TYPE INDOOR UNIT OF AIR CONDITIONER

CROSS-REFERENCE TO RELATED PATENT APPLICATIONS

This application is a U.S. National Stage Application under 35 U.S.C. § 371 of PCT Application No. PCT/KR2021/002527, filed Mar. 2, 2021, which claims priority to Korean Patent Application No. 10-2020-0026214, filed Mar. 2, 2020, whose entire disclosures are hereby incorporated by reference.

BACKGROUND

1. Field

A ceiling-type indoor unit of air conditioner, more specifically, a ceiling-type indoor unit of air conditioner including a plurality of vanes disposed at a plurality of discharge holes is disclosed.

2. Background

Generally, an air conditioner includes a compressor, a condenser, an evaporator, and expansion apparatus. The air conditioner supplies cold air or hot air to a building or room via an air conditioning cycle.

The air conditioner is structurally classified into a separate-type in which the compressor is disposed outdoors and an integral-type in which the compressor is manufactured integrally. In the separate-type air conditioner, an indoor heat exchanger is installed in the indoor unit, and an outdoor heat exchanger and a compressor are installed in the outdoor unit, and a refrigerant pipe connects two separate apparatus. In the integral-type air conditioner, an indoor heat exchanger, an outdoor heat exchanger, and a compressor are installed in one case.

The integral-type air conditioner includes a window-type air conditioner installed directly by hanging the apparatus on a window, and a duct-type air conditioner installed outside of the indoor space by connecting a suction duct and a discharge duct. In general, the separate-type air conditioner is classified by the installation type of the indoor unit.

When the indoor unit is installed vertically in an indoor space, it is called a stand-type air conditioner. When the indoor unit is installed on an indoor wall, it is called a wall-mounted air conditioner. When the indoor unit is installed on the ceiling, it is called a ceiling-type indoor unit.

Korean Patent Application No. 10-2019-0130846 discloses structure that guides discharged air through a plurality of vanes. In the ceiling-type air conditioner, as a length of the plurality of vanes is very long compared to a width thereof, there was a problem of sagging downward due to gravity and wind pressure of the discharged air.

Embodiments disclosed herein provide a ceiling-type indoor unit of air conditioner that prevents a middle part or portion of a vane, with a longer length in a right and left or lateral direction than in a back and forth or forward/rearward direction, from sagging due to self-weight. In a linkage structure of a link and the vane assembled so that relative rotation is possible, embodiments disclosed herein provide the ceiling-type indoor unit of air conditioner that prevents the vane from rotating due to self-weight.

Embodiments disclosed herein provide a ceiling-type indoor unit of air conditioner that minimizes a torsion of a vane when a plurality of vanes, with a longer length in the right and left direction than in the backward and forward direction, are rotated by one motor.

The problems solved are not limited to the problems mentioned above, and other problems that are not mentioned will be clearly understood by those who skilled in the art from the following description.

Embodiments disclosed herein have an advantage of preventing a first vane from sagging by installing a support link capable of relative rotation with respect to the first vane in the middle of the elongated first vane, and assembling the support link to be able to rotate relative to the case. Embodiments disclosed herein also have an advantage of suppressing torsion of the first vane, when the first vane rotates, by coupling a support bar disposed in a longitudinal direction of the first vane to the first vane link and the support link providing a rotational force to the first vane.

Embodiments disclosed herein include a case on which a discharge hole is formed; a first vane disposed at the discharge hole; a vane motor assembled to the case and providing a drive force to the first vane; a drive link assembled relatively rotatably with the case and coupled with the vane motor and transmitting the drive force of the vane motor to the first vane; a first vane link assembled relatively rotatably with the case and with the first vane; a support bracket coupled to the case and disposed at the discharge hole; a support link disposed between one (first) end and the other (second) end in a longitudinal direction of the first vane, and assembled relatively rotatably with the first vane and with the support bracket. Embodiments disclosed herein may further include a support bar one (first) end of which is coupled to the first vane link and t the other (second) end of which is coupled to the support link. The support bar may be disposed in the longitudinal direction of the first vane.

Embodiments disclosed herein may further include a support rib formed to protrude upwardly from an upper surface of the first vane. One end of the support link may be assembled relatively rotatably with the support rib. The support rib may be disposed between a rear end and a front end of the first vane, with respect to a flow direction of discharged air from the discharge hole. The support rib may be disposed to extend long or lengthwise in the flow direction of the discharged air from the discharge hole.

Embodiments disclosed herein may include a one side joint rib disposed at one side of the first vane and to which the first vane link is relatively rotatably assembled, and the one side joint rib and the support rib may be disposed to face each other. A length of the first vane link and a length of the support link may be formed to be same.

The support link may include a first support link body; a first support link shaft disposed below the first support link body and assembled with the support rib and rotating relatively to the first vane; and a second support link shaft disposed above the first support link body and assembled relatively rotatably with the support bracket. The first vane link may include a first vane link body; a 1-1 vane link shaft disposed under the first vane link body and assembled with the first vane and rotating relatively to the first vane; and a 1-2 vane link shaft disposed above the first vane link body and assembled with the case and rotating relatively to the case. Embodiments disclosed herein may further include a support bar that one end thereof is coupled to the 1-1 vane link shaft and the other end thereof is coupled to the first support link shaft.

The case may further include a link installation part or portion that the vane motor is assembled to one (first) side surface thereof and that the drive link and the first vane link are assembled to the other (second) side surface thereof. The other side surface of the link installation part may be exposed to the discharge hole and may be disposed to face the support bracket.

The support bracket is disposed above a bottom surface of the case, and the support bracket is formed to extend long or lengthwise in the flow direction of the discharged air from the discharge hole. The support bracket is disposed higher than the discharge hole and is disposed on a discharge flow path from the suction hole to the discharge hole.

Embodiments disclosed herein may include a second vane disposed at the discharge hole and assembled rotatably with the case, and a second vane link assembled relatively rotatably with the drive link and the second vane, respectively. The second vane may be disposed lower than the support bracket.

Embodiments disclosed herein may further include a bracket avoidance groove formed at the support bracket and formed to be concave upwardly from a lower side of the support bracket. At least part or portion of the second vane may be positioned and inserted into the bracket avoidance groove, when the second vane operates.

The drive link may include one side drive link disposed at one side of the discharge hole and may include the other side drive link disposed at the other side of the discharge hole. The first vane link may include one side first vane link disposed at the one side of the discharge hole and may include the other side first vane link disposed at the other side of the discharge hole.

The support link may include a first support bracket disposed close to the one side between the one side and the other side of the discharge hole and may include a second support bracket disposed close to the other side. The support link may include a first support link assembled relatively rotatably with the first vane and the first support bracket and may include a second support link assembled relatively rotatably with the first vane and the second support bracket.

Embodiments disclosed herein further include a first support bar coupled to the one side first vane link and the first support link, and a second support bar coupled to the other side first vane link and the second support link. The first support bar and the second support bar are arranged in a line. The first support bar and the second support bar may be disposed at a same height with respect to the first vane. The first support bar may be disposed at the front further than the one side drive link, and the second support bar may be disposed at the front further than the other side drive link.

The ceiling-type indoor unit of the air conditioner according to embodiments disclosed herein has the following effects or advantages.

First, embodiments disclosed herein have an advantage of preventing the first vane from sagging by installing a support link capable of relative rotation with respect to the first vane in the middle of the elongated first vane, and assembling the support link to be able to rotate relative to the case.

Second, embodiments disclosed herein have an advantage of suppressing the torsion of the first vane, when the first vane rotates, by coupling a support bar, disposed in the longitudinal direction of the first vane, to a first vane link and a support link providing the rotational force to the first vane.

Third, embodiments disclosed herein have an advantage of suppressing sag of the first vane and a second vane, even if the first vane and the second vane stop at an arbitrary position, because the support link and the support bar support the first vane and the second vane.

Fourth, embodiments disclosed herein have an advantage of minimizing relative rotation, to a first vane link and a drive link, of the first vane because the support link and the support bar support the first vane, the first vane link, and the drive link, even if sag or rotation occurs when the first vane stops at an arbitrary position by each of relatively rotating structures that the first vane is assembled respectively to the first vane link and to the drive link.

BRIEF DESCRIPTION OF THE DRAWINGS

FIG. 1 is a perspective view of an indoor unit of air conditioner according to an embodiment;

FIG. 2 is a cross-sectional view of FIG. 1;

FIG. 3 is an exploded perspective view showing a front panel of FIG. 1;

FIG. 4 is a perspective view showing an upper part of the front panel of FIG. 1;

FIG. 5 is a perspective view of a vane module shown in FIG. 3;

FIG. 6 is a perspective view shown from another direction of FIG. 5;

FIG. 7 is a plane view of the vane module shown in FIG. 3;

FIG. 8 is a perspective view showing an operational structure of the vane module according to an embodiment;

FIG. 9 is a perspective view showing a sag preventing structure of the first vane shown in FIG. 8;

FIG. 10 is a perspective view of the drive link shown in FIG. 8;

FIG. 11 is a perspective view of a first vane link shown in FIG. 8;

FIG. 12 is a perspective view of a second vane link shown in FIG. 8;

FIG. 13 is an example drawing of a stopped state P0 of the vane module according to an embodiment;

FIG. 14 is an example drawing of a discharge state P1 of the vane module according to an embodiment;

FIG. 15 is a cross-sectional view showing a coupling structure of a link installation unit;

FIG. 16 is a perspective view showing the first vane link and the support bar which are shown in FIG. 9;

FIG. 17 is a perspective view showing the support link and the support bar which are shown in FIG. 9;

FIG. 18 is a perspective view of the vane module, which is not in operation, according to an embodiment;

FIG. 19 is a perspective view of the vane module, which discharges air horizontally, according to an embodiment; and FIG. 20 is a perspective view of the vane module, which discharges air vertically, according to an embodiment.

DETAILED DESCRIPTION

Advantages and features of embodiments disclosed herein, and a method of achieving them will become apparent with reference to the embodiments described hereinafter together with the accompanying drawings. However, embodiments are not limited to the embodiments disclosed herein but may be implemented in a variety of different forms. The embodiments are provided to disclose completely the embodiments and to fully inform the scope to those who skilled in the art to which the embodiments pertain. The disclosure is only defined by the scope of the claims. The same reference sign refers to the same elements throughout the whole specification.

Hereinafter, an embodiment will be described with reference to the drawings.

FIG. 1 is a perspective view of an indoor unit of air conditioner according to an embodiment. FIG. 2 is a cross-sectional view of FIG. 1. FIG. 3 is an exploded perspective view showing a front panel of FIG. 1. FIG. 4 is a perspective view showing an upper part of the front panel of FIG. 1.

Referring to FIG. 1 or FIG. 2, the indoor unit of air conditioner according to an embodiment includes a case 100 at which a suction hole 101 and a discharge hole 102 are formed, an indoor heat exchanger 130 disposed inside of the case 100, an indoor blowing fan 140 that includes air into the suction hole 101 and the discharge hole 102 and disposed inside of the case 100. The indoor unit further includes a vane module 200 that controls a direction of discharged air through the discharge hole 102. The vane module 200 includes a first vane 210 and a second vane 220.

An area of the first vane 210 and an area of the second vane 220 are formed to be different. In this embodiment, the area of the first vane is formed to be wider than the area of the second vane. The first vane is positioned at an inside of the discharge hole 102 and may cover the discharge hole 102.

When the indoor unit does not operate, the second vane 220 is positioned above the first vane 210. When the vane module 200 operates, the first vane 210 opens the discharge hole 102 by descending downward with respect to the discharge hole 102 and the second vane 220 rotates in place.

Referring to FIG. 1 or FIG. 2, in this embodiment, the case 100 includes a case housing 110 and a front panel 300. The case housing 100 is installed hanging from an indoor ceiling by a hanger (not shown) and is formed by opening a bottom thereof. The front panel 300 covers an open surface of the case housing 110, and is disposed toward the floor, and is exposed to an indoor space, and has the suction hole 101 and the discharge hole 102.

The case 100 may be realized in various types depending on a manufacturing type, and embodiments disclosed herein are not limited by a configuration of the case 100.

The suction hole 101 is disposed at a center of the front panel 300, and the discharge hole 102 is disposed outside of the suction hole 101. A number of the suction holes 101 or discharge holes 102 is irrelevant. In this embodiment, one suction hole 101 is formed, and a plurality of discharge holes 102 are disposed.

In this embodiment, when viewed from a bottom, the suction hole 101 is formed in a tetragonal shape, and four discharge holes 102 are disposed to be spaced apart, by a predetermined distance, from each of edges of the suction hole 101.

Referring to FIG. 2, the indoor heat exchanger 130 is disposed between the suction hole 101 and the discharge hole 102 and partitions an inside of the case into an inner side and an outer side. The indoor heat exchanger 130 is arranged vertically in this embodiment.

The indoor blowing fan 140 is positioned in or within the indoor heat exchanger 130. When viewed from a top view or a bottom view, the indoor heat exchanger has a "☐" shape entirely and some sections thereof may be separated. The indoor heat exchanger 130 is disposed for discharged air from the indoor blowing fan 140 to enter vertically.

A drain pan 132 is installed inside of the case 100 and the indoor heat exchanger 130 is mounted on the drain pan 132. Condensate formed on the indoor heat exchanger 130 may flow into the drain pan 132 and then may be stored therein. A drain pump (not shown), that discharges collected condensate to an outside, is disposed at the drain pan 132. The drain pan 132 may include an inclined plane having directionality to store the condensate flowing downward.

Referring to FIG. 2, the indoor blowing fan 140 is positioned inside of the case 100 and is disposed above the suction hole 101. As the indoor blowing fan 140, a centrifugal blower that suctions air through a center thereof and discharges air to a circumferential direction thereof is used.

The indoor blowing fan 140 includes a bellmouth 142, a fan 144, and a fan motor 146. The bellmouth 142 is disposed above a suction grill 320 and is positioned below the fan 144. The bellmouth 142 guides air, that has passed through the suction grill 320, to the fan 144.

The fan motor 146 rotates the fan 144. The fan motor 146 is fixed to the case housing 110. The fan motor 146 is disposed above the fan 144. At least a part or portion of the fan motor 146 is positioned higher than the fan 144. A motor shaft of the fan motor 146 is disposed downward, and the fan 144 is coupled to the motor shaft.

The indoor heat exchanger 130 is positioned outside edges of the fan 144. At least a part or portion of the fan 144 and at least a part or portion of the indoor heat exchanger 130 are disposed on a same horizontal line. In addition, a part or portion of the bellmouth 142 is inserted into an inside of the fan 144. The part of the bellmouth 142 overlaps with the fan 144 in an upward and downward direction.

Referring to FIG. 2, the indoor heat exchanger 130 is disposed inside of the case housing 110 and divides the inside of the case housing 110 into the inner side and the outer side. An inner space surrounded by the indoor heat exchanger 130 is defined as a suction flow path 103, and an outer space of the indoor heat exchanger 130 is defined as a discharge flow path 104.

The indoor blowing fan 140 is disposed on or in the suction flow path 103. The discharge flow path 104 is located between an outside of the indoor heat exchanger 130 and a lateral wall of the case housing 110. When viewed from the top view or the bottom view, the suction flow path 103 is the inner space surrounded by the "☐" of the indoor heat exchanger and the discharge flow path 104 is the outside "☐" of the indoor heat exchanger.

The suction flow path 103 communicates with the suction hole 101, and the discharge flow path 104 communicates with the discharge hole 103. Air flows from a lower side of the suction flow path 103 to an upper side thereof and flows from an upper side to a lower side of the discharge flow path 104. A flow direction of the air is switched 180 degrees based on the indoor heat exchanger 130.

The suction hole 101 and the discharge hole 102 are formed on a same surface of the front panel 300. The suction hole 101 and the discharge hole 102 are arranged to face a same direction. In this embodiment, the suction hole 101 and the discharge hole 102 are arranged to face the floor of the indoor space.

When the front panel 300 is curved, the discharge hole 102 may be formed to have a slight sideways slope, but the discharge hole 102 connected to the discharge flow path 104 is formed to face downward. A vane module 200 is disposed to control a direction of air discharged through the discharge hole 102.

The front panel 300 includes a front body 310 coupled to the case housing 110 and having the suction hole 101 and the discharge hole 102 formed thereon, suction grill 320 having a plurality of grill holes 321 formed therein and covering the suction hole 101, a pre-filter 330 separably assembled or coupled to the suction grill 320, the vane module 200 installed at the front body 310 and controlling an air flow direction of the discharge hole 102. The suction grill 320 is installed to be separable from the front body 310. The suction grill 320 may be elevated, in an upward and downward or vertical direction, from the front body 310. The suction grill 320 covers the entire suction hole 101.

In this embodiment, the suction grill 320 has the plurality of grill holes 321 formed in a grid shape. The grill holes 321 and the suction hole 101 communicate with each other.

The pre-filter 330 is disposed above the suction grill 320. The pre-filter 330 filters air suctioned into the case 100. The pre-filter 330 is positioned above the grill hole 321 and filters the air passed through the suction grill 320.

The discharge hole 102 is formed in a long slit shape along an edge of the suction hole 101. The vane module 200 is positioned at the discharge hole 102 and is coupled to the front body 310.

In this embodiment, the vane module 200 may be separated down from the front body 310. That is, the vane module 200 is disposed irrespectively to a coupling structure of the front body 310 and may be independently separated from the front body 310. The structure related thereto will be described hereinafter.

Referring to FIG. 2 to FIG. 4, the front body 310 is coupled to a lower side of the case housing 110 and is disposed toward the indoor space. The front body 310 is installed at the indoor ceiling and exposed indoors and is exposed to the indoor space.

The front body 310 is coupled to the case housing 110, and the case housing 110 supports a load of the front body 310. The front body 310 supports a load of the suction grill 320 and the pre-filter 330.

The front body 310 is formed in a quadrangle shape when viewed from the top view. A shape of the front body 310 may be variously formed.

An upper side surface of the front body 310 may be horizontally formed so as to be in close contact with the ceiling. The lower side surface may have a slightly curved edge.

Suction hole 101 is disposed in a center of the front body 310. The plurality of discharge holes 102 is disposed outside of an edge of the suction hole 101. When viewed from the top view, the suction hole 101 may be formed in a square shape, and the discharge hole 102 may be formed in a rectangular shape. The discharge hole 102 may be formed in the slit shape with a length longer than a width.

The front body 310 includes a front frame 312, a side cover 314, and a corner cover 316. The front frame 312 provides a load and rigidity of the front panel 300 and is fastened and fixed to the case housing 110. The suction hole 101 and the four discharge holes 102 are formed in the front frame 312.

In this embodiment, the front frame 312 includes a side frame 311 and a corner frame 313. The corner frames 313 are disposed at each corner of the front panel 300. The side frame 311 is combined with the two corner frames 313. The side frame 311 includes an inner side frame 311a and an outer side frame 311b.

The inner side frame 311a is disposed between the suction hole 101 and the discharge hole 102 and is coupled to the two corner frames 313. The outer side frame 311b is disposed outside of the discharge hole 102. In this embodiment, four inner side frames 311a and four outer side frames 311b are provided.

The suction hole 101 is positioned inside of the four inner side frames 311a. The discharge hole 102 is formed surrounded by two corner frames 313, one inner side frame 311a, and one outer side frame 311b.

Further, the side cover 314 and the corner cover 316 are coupled to a bottom of the front frame 312. The side cover 314 and the corner cover 316 are exposed to a user, and the front frame 312 is not visible to the user.

The side cover 314 is disposed at an edge of the front frame 312. The corner cover 316 is disposed at a corner of the front frame 312.

The side cover 314 is formed of a synthetic resin material and is fastened and fixed to the front frame 312. More specifically, the side cover 314 is coupled to the side frame 311, and the corner cover 316 is coupled to the corner frame 313.

In this embodiment, four of the side cover 314 and four of the corner cover 316 are provided. The side cover 314 and the corner cover 316 are coupled to the front frame 312 and connected, as a single structure. In the front panel 300, four side covers 314 and four corner covers 316 form one edge.

The side cover 314 is disposed under the side frame 311, and the corner cover 316 is disposed under the corner frame 313.

Four side covers 314 and four corner covers 316 are assembled to form a border of a quadrangle. The connected four side covers 314 and four corner covers 316 are defined as a front deco 350.

The front deco 350 forms a deco outer border 351 and a deco inner border 352. When viewed from the top view or the bottom view, the deco outer border 351 is formed in the quadrangle shape, and the deco inner border 352 is also formed in the quadrangle shape. However, corners of the deco inner border form a predetermined curvature.

The suction grill 320 and four vane modules 200 are disposed inside of the deco inner border 352. In addition, the suction grill 320 and the four vane modules 200 are in contact with the deco inner border 352.

In this embodiment, four side covers 314 are provided, and each side cover 314 is coupled to the front frame 312. An outer edge of the side cover 314 forms a part or portion of the deco outer border 351, and an inner edge thereof forms a part or portion of the deco inner border 352.

In particular, the inner edge of the side cover 314 forms an outer boundary of the discharge hole 102. The inner edge of the side cover 314 is defined as a side deco inner border 315.

In this embodiment, four corner covers 316 are provided, and each corner cover 316 is coupled to the front frame 312. An outer edge of the corner cover 316 forms a part or portion of the deco outer border 351, and an inner edge thereof forms a part of the deco inner border 352. The inner edge of the corner cover 316 is defined as a corner deco inner border 317.

The corner deco inner border 317 may be disposed to contact the suction grill 320. In this embodiment, the inner edge of the corner cover 316 is disposed to face the suction grill 320 and is spaced apart therefrom, by a predetermined distance, to form a gap 317a. The side deco inner border 315 is also spaced apart from the vane module 200 by a predetermined distance to form a gap 315a and is disposed to face an outer edge of the vane module 200.

A continuous gap formed by the four side deco inner border gaps 315a and the four corner deco inner border gaps 317a is defined as a front deco gap 350a. The front deco gap 350a is formed at an inner edge of the front deco 350. More specifically, the front deco gap 350a is formed by spacing the outer edge of the vane module 200 and an outer edge of the suction grill 320 apart from the inner edge of the front deco 350. When the vane module 200 does not operate, that is, the indoor unit is stopped, the front deco gap 350a makes the suction grill 320 and the vane module 200 appear as one structure.

A support bracket 450 may be further disposed at the front body 310. The support bracket 450 is disposed at the discharge hole 102. The support bracket 450 is disposed to intersect with a longitudinal direction of the discharge hole 102. The support bracket 450 is disposed in a flow direction of the discharged air.

The support bracket 450 may be assembled to or integrally manufactured with elements constituting the front panel 310. For example, the support bracket 450 may be disposed at the front frame 312 or the side cover 314. The support bracket 450 may be assembled to the front frame 312 or to the side cover 314.

The support bracket 450 is disposed in a middle of one (first) side and the other (second) side of the discharge hole 102.

A plurality of support brackets 450 may be disposed or provided. In this embodiment, the support bracket 450 includes a first support bracket 451 disposed close to one side of the discharge hole 102 and a second support bracket 452 disposed close to the other side of the discharge hole 102.

The support bracket 450 may be disposed higher than the discharge hole 102 and may be disposed at the discharge flow path 104. An end of the support bracket 450 close to the suction hole 101 is defined as an inner end 453, and an end thereof close to the side cover 314 is defined as an outer end 454. In this embodiment, the inner end 453 of the support bracket 450 may be coupled to the inner side frame 311a, and the outer end 454 may be coupled to the outer side frame 311b.

The support bracket 450 is disposed higher than a bottom surface of the side cover 314. The support bracket 450 is disposed higher than the first vane 210.

The support bracket 450 may be disposed at a same height as or higher than the second vane 220. A height of the support bracket 450 and a height of the second vane 220 may overlap.

A bracket avoidance groove 455 is formed at the support bracket 450 to prevent interference due to operation (rotation) of the second vane 220. The bracket avoidance groove 455 is formed to be concave in a direction from a lower side to an upper side.

When the second vane 220 operates, a part or portion of the second vane 220 may be inserted into the bracket avoidance groove 455. When the second vane 220 operates, at least the part of the second vane 220 is inserted into the bracket avoidance groove 455 and positioned, and at least a part or portion of the second vane 220 is positioned at a same height as the bracket avoidance groove 455.

The bracket avoidance groove 455 includes a front bracket avoidance groove 455a into which a front end 222a of the second vane 220 is inserted, and a rear bracket avoidance groove 445b into which a rear end 222b of the second vane 220 is inserted. The front bracket avoidance groove 455a and the rear bracket avoiding groove 445b may be formed separately. In this embodiment, the front bracket avoidance groove 455a and the rear bracket avoidance groove 445b are formed by being connected as one.

The support bracket 450 includes an assembly part or portion 456 to which any one of support link 490 or a support bar 470, described hereinafter, is assembled. The support link 490 or the support bar 470 may be assembled to the assembly part 456 and relatively rotate to the support bracket 450.

The assembly part 456 is disposed outside of the bracket avoidance groove 455 based on the suction hole 101 or the discharge hole 102. Based on the flow direction of the discharged air, the assembly part 456 is disposed more toward or in the flow direction than the bracket avoidance groove 455.

When the second vane 220 operates, a vane avoidance grooves 457, 458 that avoids interference with the support bracket 450 may be additionally formed in the second vane 220. First vane avoidance groove 457 is disposed at a front side of the second vane 220 and is formed in the backward and forward direction. The first vane avoidance groove 457 is formed to be wider than a width, in a right and left or lateral direction, of the support bracket 450.

Second vane avoidance groove 458 is disposed at a rear side of the second vane 220 and is formed in the backward and forward direction. The second vane avoidance groove 458 is formed to be wider than a width, in the right and left direction, of the support bracket 450.

When the second vane 220 operates, the front end 222a of the support bracket 450 may be inserted into the first vane avoidance groove 457. When the second vane 220 operates, the rear end 222b of the support bracket 450 may be inserted into the second vane avoidance groove 458.

The suction grill 320 is positioned under the front body 310. The suction grill 320 may move downward with it is in close contact with a bottom surface of front body 310. The suction grill 320 includes a grill body 322 and a plurality of grill holes 321 formed to penetrate the grill body 322 in the upward and downward direction.

The suction grill 320 includes the grill body 322 that is disposed under the suction hole 101 and communicates with the suction hole 101 by the plurality of grill holes 321 and formed in a quadrangle shape, and a grill corner part or portion 327 formed to extend, in a diagonal direction, from a corner of the grill body 322.

A bottom surface of the grill body 322 and a bottom surface of the first vane 210 may form a continuous surface. In addition, the bottom surface of the grill body 322 and a bottom surface of the corner cover 316 may form a continuous surface.

Inside of the grill body 322, a plurality of grills 323 is disposed in a grid shape. The grid-shaped grill 323 forms a quadrangle-shaped grill hole 321. A section in which the grill 323 and the grill hole 321 are formed is defined as a suction part or portion.

The grill body 322 includes a suction part through which air passes, and a grill body part or portion 324 disposed to surround the suction part. When viewed from the top view or the bottom view, the suction unit is formed overall in the quadrangle shape.

Each corner of the suction part is disposed to face each corner of the front panel 300, and more particularly, to face the corner cover 316. When viewed from the bottom view, the grill body 322 is formed in the quadrangle shape.

An outer edge of the grill body part 324 is disposed to face the discharge hole 102 or the front deco 350. The outer edge of the grill body part 324 includes a grill corner border 326 disposed to face the corner cover 316, the discharge hole 102, and a grill side border 325 disposed to face the side cover 314.

The grill corner border 326 is formed with a curvature centered on an inside of the suction grill 320. The grill side border 325 may be formed with a curvature centered on an outside of the suction grill 320.

The grill body part 324 further includes a grill corner part or corner 327 surrounded by the grill corner border 326 and two grill side borders 325. The grill corner part 327 is formed to protrude, from the grill body part 324, toward the corner cover 316.

The grill corner part 327 is disposed at each corner of the grill body 322. The grill corner part 327 extends toward each corner of the front panel 300.

In this embodiment, four grill corner parts 327 are disposed. For convenient explanation, the four grill corner parts 327 are defined as first grill corner part 327-1, second grill corner part 327-2, third grill corner part 327-3, and fourth grill corner part 327-4.

The grill side border 325 is formed in a concave shape from an outside to an inside thereof.

A discharge hole 102 is formed between the side cover 314 and the suction grill 320. More specifically, one discharge hole 102 is formed between the side deco inner border 315 of the side cover 314 and the grill side border 325 of the grill body 322. Each discharge hole 102 is formed between the side deco inner border 315, disposed in the four directions of the suction grill 320, and the grill side border 325.

In this embodiment, a length of the grill corner border 326 and a length of the corner deco inner border 317 are formed to be same. That is, a width of the corner cover 316 and a width of the grill corner part 327 are formed to be same. In addition, an inner width of the side cover 314 and a width of the grill side border 325 are formed to be same.

The grill side borders 325 are further described hereinafter.

The grill side border 325 forms an inner boundary of the discharge hole 102. The side deco inner border 315 and the corner deco inner border 317 form an outer boundary of the discharge hole 102.

The grill side border 325 includes a long straight line section 325a extending in the longitudinal direction of the discharge hole 102 and formed in a straight line, a first curved line section 325b connected to one (first) side of the long straight line section 325a and having a center of curvature formed outside of the suction grill 320, a second curved line section 325c connected to the (second) side of the long straight section 325a and having a center of curvature formed outside of the suction grill 320, a first short straight line section 325d connected to the first curved line section 325b, and a second short straight line section 325e connected to the second curved line section 325c.

The vane module 200 is installed in the discharge flow path 104 and controls the flow direction of the discharged air from the discharge hole 102. The vane module 200 includes a module body 400, first vane 210, second vane 220, vane motor 230, drive link 240, first vane link 250, second vane link 260, support link 490, and support bar 470.

The first vane 210, the second vane 220, the vane motor 230, the drive link 240, the first vane link 250, and the second vane link 260 are all installed to or on the module body 400. The module body 400 is installed on the front panel 300 as one body. That is, whole parts of the vane module 200 are modularized and installed on the front panel 300 simultaneously. As the vane module 200 is modularized, it is possible to shorten a time for assembly and to replace easily in case of breakdown.

In this embodiment, a step motor is used as the vane motor 230. The drive link 240, the first vane link 250, and the second vane link 260 are elements for operating the first vane link 210 and the second vane link 220 simultaneously.

The support link 490 and the support bar 470 are elements that prevent the first vane 210 from sagging. As the same parts or components are disposed in the first module body 410 and the second module body 420, when distinction is needed, an element disposed at the first module body 410 is referred to as "one side", and an element disposed on the second module body 420 is referred to as "the other side". The drive link includes one side drive link disposed on one side of the discharge hole, the other side drive link disposed on the other side of the discharge hole, and the first vane link includes one side first vane link disposed on one side of the discharge hole and the other side first vane link disposed on the other side of the discharge hole.

FIG. 5 is a perspective view of a vane module shown in FIG. 3. FIG. 6 is a perspective view shown from other direction of FIG. 5. FIG. 7 is a plane view of the vane module shown in FIG. 3. FIG. 8 is a perspective view showing an operational structure of the vane module according to an embodiment.

Referring to FIG. 3 and FIGS. 5 to 8, the module body 400 may be configured as one body. In this embodiment, to minimize an installation space and to minimize manufacturing costs, it is manufactured by being separated into two parts or components. In this embodiment, the module body 400 includes first module body 410 and second module body 420.

The first module body 410 and the second module body 420 are formed to be symmetrically to the left and right or laterally. In this embodiment, common elements will be described by taking the first module body 410 as an example.

The first module body 410 and the second module body 420 are fastened to the front body 310, respectively. More specifically, the first module body 410 and the second module body 420 are installed at the corner frame 313, respectively.

With respect to a horizontal direction, the first module body 410 is installed at the corner frame 313 disposed at one side of the discharge hole 102, and the second module body 420 is installed at the corner frame 313 disposed at the other side of the discharge hole 102.

In the upward and downward direction, the first module body 410 and the second module body 420 are in close contact with a bottom surface of each corner frame 313 and are respectively fastened using a fastening member 401. Thus, the first module body 410 and the second module body 420 are disposed on the lower side of the front body 310. When viewed in an installed state of the indoor unit, a fastening direction between the first module body 410 and the corner frame 313 is toward the upper side from the lower side, and a fastening direction between the second module body 420 and the corner frame 313 is also toward the upper side from the lower side. Due to this structure, the entire vane module 200 may be easily separated from the front body 310 during a service process.

The vane module 200 includes first module body 410 disposed on one side of the discharge hole 102, positioned under the front body 310 and assembled to be separable downward from the front body 310, and second module body 420 disposed on the other side of the discharge hole 102, positioned on the lower side of the front body 310 and assembled to be separable downward to the front body 310. The first vane 210 and the second vane 220 on that one side and the other side thereof are coupled respectively to the first module body 410 and the second module body 420, and rotate respectively relatively to the first module body 410 and the second module body 420. The vane motor 230 is installed on at least any one of the first module body 410 or the second module body 420 and provides a drive force to the first and second vanes 210 and 220.

In particular, as the first module body 410 and the second module body 420 are positioned under the front body 310, only the vane module 200 may be separated, while the front body 310 is installed in the case housing 110, from the front body 310. This is commonly applied to all of the four vane modules 200.

When the module body 400 is separated from the front body 310, the entire vane module 200 is separated toward the lower side of the front body 310.

The module body 400 includes the module body part 402 coupled to the front body 310, exposed to the outside, and formed by opening an upper side thereof, and a link installation part or portion 404 providing one surface among side surfaces of the module body 402, to which the vanes 210 and 220 are coupled.

The module body part 402 is fastened to the front body 310 by the fastening member 401. Unlike this embodiment, the module body part 402 may be coupled to the front body 310 by a hook coupling or interference fit, for example.

A fastening hole 403 is formed on the module body part 402. The fastening member passes through the module body part 402 and is coupled to the front body 310.

In this embodiment, the module body part 402, a module body border 440, and the link installation part 404 are manufactured, as one body, by injection molding, for example. The link installation part 404 is disposed adjacent to the first vane 210 and the second vane 220, among the four surfaces of the module body part 402.

The drive link 240, the first vane link 250, and the second vane 220 are assembled or coupled to the link installation part 404. The drive link 240, the first vane link 250, and the second vane 220 may respectively rotate with assembling to the link installation part 404.

In this embodiment, to minimize vibration or noise generation by the first vane 210, the second vane 220, the vane motor 230, the drive link 240, the first vane link 250, and the second vane link 260, for example, the module body part 402 is stably fastened to the front body 310.

The fastening member 401 for fixing the module body part 402 is in a state of being fastened in the direction from the lower side to the upper side and may be separated toward the lower side from the upper side. Fastening hole 403 through which the fastening member 401 passes is formed in the module body part 402.

The link installation part 404 of the first module body 410 and the link installation part 404 of the second module body 420 are disposed to face each other. Between the link installation part 404 of the first module body 410 and the link installation part 404 of the second module body 420, the first vane 210, the second vane 220, the drive link 240, the first vane link 250, the second vane link 260, the support link 490, and the support bar 470 are installed.

The vane motor 230 is disposed outside of the link installation part 404. The first vane 210, the second vane 220, the drive link 240, the first vane link 250, the second vane link 260, the support link 490, and the support bar 470 are disposed inside of the link installation parts 404.

The vane motor 230 may be installed on at least any one of the first module body 410 or the second module body 420.

In the link installation part 404, a drive link coupling part or portion 407 to which the drive link is assembled or coupled and providing a rotational center to the drive link 240, a first vane link coupling part or portion 408 to which the first vane link 250 is assembled or coupled and providing a rotational center to the first vane link 250, and a second vane link coupling part or portion 409 coupled to the second vane 220 and providing a rotational center to the second vane 220 are disposed. In this embodiment, the drive link coupling part 407 and the first vane link coupling part 408 are formed in the form of a hole penetrating the link installation part 404.

The drive link 240 is rotatably assembled to the drive link coupling part 407. The first vane link 250 is rotatably assembled to the first vane link coupling part 408. The second vane 220 is rotatably assembled to the second vane coupling part 409.

A second vane shaft 221 of the second vane 220 is inserted into the second vane coupling part 409. In this embodiment, the second vane coupling part 409 is formed in the shape of a boss protruding toward the module body 400 at an opposite side. Unlike this embodiment, it may be realized in various forms providing a rotational axis.

A stopper 270 that limits a rotational angle of the drive link 240 is disposed at the link installation part 404. The stopper 270 is formed to protrude toward the vanes 210, 220 from the link installation part 404 at an opposite side. As the stopper 270 is formed along an edge of a drive link boss 447, it is formed in arc shape.

In this embodiment, the stopper 270 is disposed between the drive link coupling part 407 and the first vane link coupling part 408. In this embodiment, the stopper 270 is manufactured as one body with the link installation part 404.

The stopper 270 generates interference at a certain position when the drive link 240 rotates and then limits rotation of the drive link 240. The stopper 270 is positioned within a radius of rotation of the drive link 240.

FIG. 10 is a perspective view of the drive link shown in FIG. 8. Referring to FIG. 10, the drive link 240 is directly connected to the vane motor 230. The motor shaft (not shown) of the vane motor 230 is directly coupled to the drive link 240, and an amount of rotation of the drive link 240 is determined depending on a rotational angle of a rotational axis of the vane motor 230. The drive link 240 passes through the link installation part 404 and is assembled to the vane motor 230. In this embodiment, the drive link 240 passes through the drive link coupling part 407.

The drive link 240 includes a drive link body 245, a first drive link shaft 241 disposed at the drive link body 245 and coupled rotatably to the first vane 210, a core link shaft 243 disposed at the drive link body 245 and coupled rotatably to the link installation part 404, more specifically, the drive link coupling part 407, a second drive link shaft 242 disposed at the drive link body 245 and coupled rotatably to the second vane link 260. The drive link body 245 includes a first drive link body 246, a second drive link body 247, and a core body 248.

The core link shaft 243 is disposed at the core body 248, the first drive link shaft 241 is disposed at the first drive link body 246, and the core link shaft 243 is disposed at the second drive link body 247. The core body 248 connects the first drive link body 246 and the second drive link body 247. The first drive link body 246, the second drive link body 247, and the core link shaft 243 are connected to the core body 248.

The core link shaft 243 protrudes from the core body 248 toward the vane motor 230. The core link shaft 243 is rotatably assembled with the link installation part 404. The core link shaft 243 is assembled to the drive link coupling part 407 formed at the link installation part 404. The core link shaft 243 may rotate relatively to the drive link coupling part 407.

The first drive link shaft 241 and the second drive link shaft 242 protrude in a direction opposite to the core link shaft 243. The first drive link shaft 241 and the second drive link shaft 242 protrude toward the first vane 210 and the second vane 220.

The drive link 240 is disposed at an inside (at a vane side) with respect to the link installation part 404. Only the core link shaft 243 of the drive link 240 passes through the link installation part 404 and is disposed outside of the link installation part 404 (at a vane motor side).

The core link shaft 243 is formed in a cylindrical shape an inside of which is empty. The motor shaft 231 of the vane motor 230 is inserted into a hollow formed in the inside of the core link shaft 243. The core link shaft 243 passes through the drive link coupling part 407.

There are no special restrictions on shapes of the first drive link body 246 and the second drive link body 247. The first drive link body 246 and the second drive link body 247 may be formed in the shape of a straight line or curved line.

The first drive link body 246 is formed longer than the second drive link body 247. The first drive link shaft 241 is rotatably assembled with the first vane 210. The second drive link shaft 242 is rotatably assembled with the second vane link 260.

The first drive link body 246 is connected with the core body 248 and extends in a direction orthogonal to the core link shaft 243. The first drive link body 246 extends in a direction parallel to a thickness of the core body 248.

The first drive link shaft 241 is a shaft rotation structure for rotation with the first vane 210. The second drive link body 247 is connected with the core body 248 and extends in the direction orthogonal to the core link shaft 243. The second drive link body 247 extends in the direction parallel to the thickness of the core body 248.

The second drive link shaft 242 is formed in a cylindrical shape. The second drive link shaft 242 passes through the second vane link 260.

The first drive link body 246 and the second drive link body 247 form a predetermined contained angle E. A virtual straight line, that connects the first drive link shaft 241 and the core link shaft 243, and a virtual straight line, that connects the core link shaft 243 and the second drive link shaft 242, form the predetermined contained angle E. The predetermined contained angle E is formed to be more than 90 degrees and less than 180 degrees.

The first drive link shaft 241 provides a structure in which the drive link body 245 and the first vane 210 may rotate relatively to each other. In this embodiment, the first drive link shaft 241 is formed with the drive link body 245 as one body. Unlike this embodiment, the first drive link shaft 241 may be manufactured with the first vane 210 or a joint rib 214 as one body.

The core link shaft 243 provides a structure in which the drive link body 245 and the module body, more specifically, the link installation part 404, may rotate relatively each other. In this embodiment, the core link shaft 243 is formed integrally with the drive link body 245.

The second drive link shaft 242 provides a structure in which the second vane link 260 and the drive link 240 may rotate relatively each other. In this embodiment, the second drive link shaft 242 is formed with the drive link body 245 as one body. Unlike this embodiment, the second drive link shaft 242 may be manufactured with the second vane link 260 as one body.

In this embodiment, the second drive link shaft 242 is disposed at the second drive link body 247. The second drive link shaft 242 is disposed at an opposite side of the first drive link shaft 241 with respect to the core link shaft 243.

FIG. 11 is a perspective view of the first vane link shown in FIG. 8. Referring to FIG. 11, in this embodiment, the first vane link 250 is formed of a robust material.

The first vane link 250 includes a first vane link body 255 formed of the robust material, the 1-1 vane link shaft 251 disposed at one side of the first vane link body 255 and assembled with the first vane 210, more specifically, with a second joint part, rotating relatively to the firsts vane 210, the 1-1 vane link shaft installation part disposed at one side of the first vane link body 255 and formed to extend toward the first vane 210 from the first vane link body 255 and at which the 1-1 vane link shaft is disposed, the 1-2 vane link shaft disposed at the other side of the first vane link body 255 and assembled with the module body 400, more specifically, with the link installation part 404, and rotating relatively to the module body 400, and the 1-2 vane link shaft installation part disposed at the other side of the first vane link body 255 and formed to be extended toward the module body 400, more specifically, toward the first vane link coupling part 408, from the first vane link body 255 and at which the 1-2 vane link shaft is disposed.

The 1-1 vane link shaft 251 protrudes toward the first vane 210. The 1-1 vane link shaft 251 may be assembled with the first vane 210 and may rotate relatively to the first vane 210.

The 1-2 vane link shaft 252 is assembled to the link installation part 404 of the module body 400. More specifically, the 1-2 vane link shaft 252 may be assembled to the first vane link coupling part 408 and may rotate relatively to the first vane link coupling part 408.

The 1-1 vane link shaft 251 and the 1-2 vane link shaft 252 protrude in directions opposite to each other. Therefore, the 1-1 vane link shaft installation part 253 and the 1-2 vane link shaft installation part 254 are arranged to face in the directions opposite to each other.

In this embodiment, a longitudinal direction of the first vane link body 255 and a disposition direction of the 1-1 vane link shaft installation part 254 are orthogonal, and a longitudinal direction of the first vane link body 255 and a disposition direction of the 1-2 vane link shaft installation part 254 are orthogonal. The 1-1 vane link shaft installation part 253 is formed in a disk shape. The 1-1 vane link shaft installation part 253 is formed to be wider than a diameter of the 1-1 vane link shaft 251. The 1-1 vane link shaft installation part 253 is in close contact with the first vane 210 and may support the first vane 210.

The 1-1 vane link shaft 251 is a shaft rotation structure for rotation with the first vane 210. The 1-2 vane link shaft 252 is a shaft rotation structure for rotation with the link installation part 404.

The support bar 470 is assembled or coupled to the 1-2 vane link shaft 252. The support bar 470 couples the support bracket 450 and the first vane link 250.

FIG. 12 is a perspective view of the second vane link shown in FIG. 8. Referring to FIG. 12, in this embodiment, the second vane link 260 is formed of a robust material.

The second vane link 260 includes a second vane link body 265, the 2-1 vane link shaft 261 disposed at one (first) side of the second vane link body and assembled with the second vane 220 and rotating relatively to the second vane 220, the 2-1 vane link installation part 263 extended from the second vane link body 265 toward the second vane 220 and at which the 2-1 vane link shaft 261 is disposed, and the 2-2 vane link shaft part 262 disposed at the other (second) side of the second vane link body 265 and assembled with the drive link 240, more specifically, with the second drive link shaft 242) and rotating relatively to the drive link 240.

In this embodiment, the 2-2 vane link shaft part 262 is formed in the shape of a hole piercing the second vane link body 265. The 2-2 vane link shaft part 262 and the second drive link shaft 242 are assembled to each other to provide a shaft rotation structure capable of relative rotation.

If any one of the 2-2 vane link shaft part 262 or the second drive link shaft 242 is formed in the shape of a shaft, the other may be formed in the shape, providing a center of rotation, of a hole or a boss. Unlike this embodiment, the 2-2 vane link shaft may be formed in the shape of a shaft, and the second drive link shaft may be formed in the shape of a hole.

In all elements capable of relative rotation by being combined with the drive link, the first vane link, and the second vane link, replacement of such elements is possible, and a deformable example thereof will not be described in detail.

The 2-1 vane link shaft 261 protrudes toward the second vane 220. The 2-1 vane link shaft 261 may be assembled with the second vane 220 and may rotate relatively to the second vane 220. In this embodiment, a longitudinal direction of the second vane link body 265 and a disposition direction of the 2-1 vane link shaft installation part 263 are orthogonal.

The 2-1 vane link shaft installation part 263 is formed in a disk shape. The 2-1 vane link shaft installation part 263 is formed to be wider than a diameter of the 2-1 vane link shaft 261. The 2-1 vane link shaft installation part 263 may be in close contact with the second vane 220 and may support the second vane 220.

The 2-1 vane link shaft 261 is a shaft rotation structure for relative rotation with the second vane 220. The 2-1 vane link shaft 261 is formed in a cylindrical structure.

In this embodiment, the 2-2 vane link shaft part 262 is formed in the shape of a hole penetrating the second vane link body 265. The second drive link shaft 242 of the drive link 240 is assembled to the 2-2 vane link shaft part 262. The second drive link shaft 242, in a state of being assembled with the 2-2 vane link shaft part 262, may rotate relatively.

FIG. 9 is a perspective view showing a sag preventing structure of the first vane shown in FIG. 8. FIG. 15 is a cross-sectional view showing a coupling structure of a link installation unit. FIG. 16 is a perspective view showing the first vane link and the support bar which are shown in FIG. 9. FIG. 17 is a perspective view showing the support link and the support bar which are shown in FIG. 9.

Referring to FIGS. 7 to 9 and 15 to 20, one (first) side of the support link 490 is relatively rotatably assembled with a support rib 219 of the first vane 210, and the other (second) side is relatively rotatably assembled with the assembly part 456 of the support bracket 450. The one side of the support link 490 is positioned above the other side thereof. The entire structure of the support link 490 is similar to that of the first vane link 250.

The support link 490 includes a first support link body 495 formed of a robust material, a first support link shaft 491 disposed at one side (in this embodiment, at lower side) of the first support link body 495 and assembled with the first vane 210, more specifically, with the support rib 219, and rotating relatively to the first vane 210, and a second support link shaft 492 disposed at the other side (in this embodiment, at upper side) of the first support link body 495 and assembled with the support bracket 450, more specifically, with the assembly part 456, and rotating relatively to the support bracket 450.

The support link 490 further includes a first support link shaft installation part or portion 493 disposed at one side of the first support link body 495 and at which the first support link shaft 491 is disposed, and a second support link shaft installation part or portion 494 disposed at the other side of the support link body 495 and at which the second support link shaft 492 is disposed. The first support link shaft 491 and the second support link shaft 492 protrude in an opposite direction with respect to the first support link body 495. In addition, the 1-2 vane link shaft 252 and the second support link shaft 492 protrude in directions opposite to each other, and the support bar 470 is disposed between the 1-2 vane link shaft 252 and the second support link shaft 492.

In this embodiment, the support bar 470 is disposed between the second support link shaft installation part 494 and the 1-2 vane link shaft installation part 254. In particular, one (first) end of the support bar 470 is coupled to the 1-2 vane link shaft installation part 254, and the other (second) side of the support bar 470 is coupled to the second support link shaft installation part 494. The support bar 470 is respectively coupled to the second support link shaft installation part 494 and the 1-2 vane link shaft installation part 254, and it is advantageous not to rotate relatively.

The support bar 470, the second support link shaft installation part 494, and the 1-2 vane link shaft installation part 254 are coupled in one body, thereby it is possible to transmit, to the support link 490, the rotational force of the first vane link 210. As the rotational force of the first vane link 210 is transmitted to the support link 490 through the support bar 470, torsion in a longitudinal direction of the first vane 210 may be minimized. As the first vane 210 is supported by the support bracket 450 through the support bar 470, sagging of the first vane 210 may be suppressed.

It is advantageous to make a length between the first support link shaft 491 and the second support link shaft 492 and a length between the 1-1 vane link shaft 251 and the 1-2 vane link shaft 252 equal. In addition, it is advantageous that the first support link shaft 491 and the 1-1 vane link shaft 251 are disposed at a same height based on a bottom surface of the front body 310 or the suction hole 101.

It is enough that only one support bracket 450 and only one support bar 470 are disposed. In this embodiment, to actively suppress sagging of the first vane 210, the support bracket 450 and the support bar 470 are disposed on one side and the other side of the first vane 210.

When the classification of a plurality of support brackets 450, support bars 470, and the support links 490 is needed, those disposed at one side (in this embodiment, the first module body side) of discharge hole 102 are referred to as the first support bracket 451, first support bar 471, and first support link 491, and those disposed at the other side in this embodiment, the second module body side, of the discharge hole 102 are referred to as second support bracket 452, second support bar 472, and the second support link 492.

The first support link 491 is disposed close to the one side between the one side and the other side of the discharge hole 102, and the second support link 492 is disposed close to the other side between one side and the other side of the discharge hole 102. The first support link 491 is relatively rotatably assembled with the first vane 210 and the first support bracket 451, and the second support link 492 is relatively rotatably assembled with the first vane 210 and the second support bracket 452.

The first support bar 471 is coupled to the one side first vane link and the first support link 491, and the second support bar 472 is coupled to the other side first vane link and the second support link 492. The first support bar 471 and the second support bar 472 are arranged in a line. The first support bar 471 and the second support bar 472 are disposed at a same height with respect to the first vane 210.

The first support bar 471 is disposed in front of the one side drive link. The second support bar 472 is disposed in front of the other drive link.

Referring to FIG. 7 or FIG. 8, the first vane 210 is disposed between the link installation part 404 of the first module body 410 and the link installation part 404 of the second module body 420. When the indoor unit does not operate, the first vane 210 covers most of the discharge hole 210. Unlike this embodiment, the first vane 210 may be manufactured to cover the entire discharge hole 210.

The first vane 210 is coupled to the drive link 240 and the first vane link 250. The drive link 240 and the first vane link 250 are disposed on one side and the other side of the first vane 210, respectively. The first vane 210 relatively rotates to the drive link 240 and the first vane link 250, respectively.

When it is needed to distinguish positions of the drive link 240 and the first vane link 250, the drive link 240 coupled to the first module body 410 is referred to as the first drive link, and the first vane link 250 coupled to the first module body 410 is defined as the 1-1 vane link. The drive link 240 coupled to the second module body 420 is referred to as the second drive link, and the first vane link 250 coupled to the second module body 420 is defined as the 1-2 vane link.

The first vane 210 includes the first vane body 212 formed to extend in the longitudinal direction of the discharge hole 102, and the joint rib 214 protruding upwardly from the first vane body 212 and coupled to the drive link 240 and the first vane link 250. The first vane body 212 controls the direction of air discharged along the discharge flow path 104. The discharged air may collide with an upper or a lower surface of the first vane body 212 to be guided in the flow direction. The discharge direction of air and a longitudinal direction of the first vane body 212 are orthogonal or intersected.

A bottom surface of the first vane body 212 is formed in a flat or curved surface, and various structures including the joint rib 214 are disposed on an upper surface thereof. A plane of the first vane body 212 corresponds to a shape of the discharge hole 102.

The joint rib 214 is an installation structure for coupling the drive link 240 and the first vane link 250. The joint ribs 214 are disposed on one side and the other side of the first vane 210, respectively.

The joint rib 214 is formed to protrude upwardly from an upper surface of the first vane body 212. The joint rib 214 is formed along the flow direction of the discharged air and minimizes resistance to the discharged air. The joint rib 214 is orthogonal to or crosses the longitudinal direction of the first vane body 212.

The joint rib 214 is formed to have a side (forward), with a high height, in the direction that air is discharged and a side (backward), with a low height, in the direction that air is introduced. In this embodiment, the joint rib 214 is formed to have a side, with a high height, to which the drive link 240 is coupled and a side, with a low height, to which the first vane link 250 is coupled.

The joint rib 214 includes a second joint part or portion 217 rotatably coupled to the drive link 240, and a first joint part or portion 216 rotatably coupled to the first vane link 250. The joint rib 214 may be manufactured with the first vane body 212 as one body.

In this embodiment, the first joint part 216 and the second joint part 217 are formed in the shape of a hole and penetrates the joint rib 214. The first joint part 216 and the second joint part 217 have a structure capable of shaft coupling or hinge coupling and may be formed in various shapes.

When viewed from the front, the second joint part 217 is positioned higher than the first joint part 216. The second joint part 217 is positioned at the rear further than the first joint part 216. The first drive link shaft 241 is assembled to the second joint part 217. The second joint part 217 and the first drive link shaft 241 are relatively rotatably assembled. In this embodiment, the first drive link shaft 241 is assembled by passing through the second joint part 217.

The 1-1 vane link shaft 251 is assembled to the first joint part 216. The first joint part 216 and the 1-1 vane link shaft 251 are relatively rotatably assembled. In this embodiment, the 1-1 vane link shaft 251 passes through the first joint 216 and is assembled with each other.

When viewed from the top, the drive link 250 and the first vane link 250 are disposed between the joint rib 214 and the link installation part 404. In this embodiment, a distance between the first joint part 216 and the second joint part 217 is formed to be narrower than a distance between the core link shaft 243 and the 1-2 vane link shaft 252.

Two joint ribs 214 are disposed at the first vane 210. When it is needed to distinguish the two joint ribs 214 disposed at the first vane 210, when viewed from the front of the vane module, the joint rib 214 disposed at the left side is defined as the left joint rib, and the joint rib disposed at the right side of the vane module is defined as the right joint rib.

The support rib 219 is disposed between the left joint rib and the right joint rib. In this embodiment, as a plurality of support ribs 219 is provided, the support ribs 219 disposed on the left are referred to as the left support rib, and the support rib 219 disposed on the right are referred to as the right support rib.

Referring to FIG. 7 or 14, the second vane 220 is formed to have a smaller area than the first vane 210. When controlling the discharge direction of air, the second vane 220 has less influence than the first vane 210. In this embodiment, the first vane 210 operates as a main vane controlling the discharge direction of air, and the second vane 220 operates as a sub vane.

The second vane 220 is installed on the discharge flow path 104 and rotates in place with respect to the second vane shaft 221. The front end 222a of the second vane 220 may be positioned outside of the discharge hole 102 depending on the rotational angle of the second vane 220.

In this embodiment, the second vane 220 is formed of a transparent or translucent material. The second vane 220 includes a second vane body 222 formed to extend long in the longitudinal direction of the discharge hole 102, a joint rib 224 that protrudes upwardly from the second vane body 222 and relatively rotatably coupled with the second vane link 260, and a pair of the second vane shaft 221 formed at one (first) side and the other (second) side of the second vane body 222 and rotatably coupled with the link installation part 404, more specifically, with the second vane coupling part 409.

The second joint rib 224 is relatively rotatably coupled to the second vane link 260. A hole formed in the second joint rib 224 and relatively rotatably coupled to the second vane link 220 is defined as a third joint part or portion 226.

The second joint rib 224 is formed to protrude upwardly from an upper surface of the second vane body 222. It is advantageous for the second joint rib 224 to be formed along the flow direction of the discharged air. Therefore, the second joint rib 224 is disposed to be orthogonal to or intersecting with a longitudinal direction of the second vane body 222.

The second vane 220 may be rotated relatively with respect to the second joint rib 224, and may be rotated relatively to the second vane shaft 221. That is, the second vane 220 may rotate relatively at each of the second joint rib 224 and the second vane shaft 221.

When viewed from the top, the second joint rib 224 is positioned in front of the second vane shaft 221. The second joint rib 224 moves in a constant orbit around the second vane shaft 221. Two second joint ribs 224 are disposed at the second vane 220.

A bottom surface of the second vane body 222 may be formed in a gentle curved surface. The second vane body 222 controls the direction of the discharged air along the discharge flow path 104. The discharged air collides with the upper or lower surface of the second vane body 222 to be guided in the flow direction.

The second vane shaft 221 is positioned behind the second joint rib 224. The second vane link 260, the drive link 240, and the first vane link 250 are sequentially disposed in front of the second vane shaft 221. In addition, the drive link coupling part 407 and the first vane link coupling part 408 are sequentially disposed in front of the second vane coupling part 409.

FIG. 18 is a perspective view of the vane module, which is not in operation, according to an embodiment. FIG. 19 is a perspective view of the vane module, in a horizontal wind state, according to an embodiment. FIG. 20 is a perspective view of the vane module, in a vertical wind state, according to an embodiment.

When the indoor unit does not operate in this embodiment (when an indoor blower does not operate), in each vane module 200, as shown, the second vane 220 is positioned above the first vane 210, and the first vane 210 covers the discharge hole 102. A lower surface of the first vane 210 forms a continuous surface with the lower side of the suction grill 320 and with the lower surface of the side cover 314.

When the indoor unit does not operate, as the second vane 220 is located above the first vane 210, it is in a hidden state when viewed from the outside. The second vane 220 is exposed to the user only when the indoor unit operates. Thus, the second vane 220 is positioned on the discharge flow path 104 when the indoor unit does not operate, and the first vane 210 covers most of the discharge hole 102.

In this embodiment, the first vane 210 covers only most of the discharge hole 102, but the first vane 210 may be formed to entirely cover the discharge hole 210 according to the design.

When the indoor unit is stopped and the vane module 200 is not operated is defined as a stopped state P0.

FIG. 13 is an example drawing of a stopped state P0 of the vane module according to an embodiment. Referring to FIGS. 13 and 18, at the stopped state P0, the vane module 200 is not in operation. When the indoor unit does not operate, the vane module 200 maintains the stopped state P0.

In the stopped state P0, the vane motor 230 of the vane module 200 rotates the drive link 240 to a maximum in a first direction, that is, in the drawing. In this case, the second drive link body 247 constituting the drive link 240 is supported by one side end 271 of the stopper 270, and further rotation in the first direction is restricted.

To prevent over-rotation of the drive link 240, at the stopped state P0, the second drive link body 247 and the other end 270b of the stopper 270 interfere with each other.

The second drive link body 247 is supported by the stopper 270, and further rotation is restricted.

The drive link 240 is rotated in the first direction around the core link shaft 243, and the first vane link 250 is rotated in the first direction around the 1-2 vane link shaft 252. The first vane 210 is rotated while being constrained by the drive link 240 and the first vane link 250, and is positioned in the discharge hole 102. The lower side of the first vane 210 forms a continuous surface with suction panel 320 and the side cover 314.

In the stopped state P0, the second vane 220 is positioned above the first vane 210. When viewed on a plane, the second vane 220 is positioned between the first joints 214 and is positioned above the first vane body 212.

In the stopped state P0, the drive link 240, the first vane link 250, and the second vane link 260 are positioned above the first vane 210. The drive link 240, the first vane link 250, and the second vane link 260 are covered by the first vane 210 and are not visible from the outside. That is, in the stopped state P0, the first vane 210 covers the discharge hole 102 and blocks parts or components constituting the vane module 200 from being exposed to the outside.

In the stopped state P0, the drive link 240 is rotated clockwise as far as possible, and the second vane link 260 is in a state raised to the maximum. When the indoor unit does not operate, as the second vane 220 is positioned above the first vane 210, it is in a hidden state when viewed from the outside. The second vane 220 is exposed to the user only when the indoor unit operates.

At the stopped state P0, a relation of position of the shafts forming centers of rotation of each link is as follows.

First, the first joint part 216 and the second joint part 217 of the first vane 210 are disposed approximately horizontally. The second joint rib 224 of the second vane 220 is positioned above the first joint rib 214.

When viewed from the lateral side, the second joint rib 224 is positioned above the second joint part 217 and the first joint part 216 and is positioned between the first joint part 216 and the second joint part 217. As the 2-1 vane link shaft 261 is coupled to the second joint rib 224, the 2-1 vane link shaft 261 is also positioned above the second joint part 217 and the first joint part 216.

The first joint part 216 and the second joint part 217 are positioned above the first vane body 212 and are positioned below the second vane body 222. The 2-2 vane link shaft part 262 is positioned above the 2-1 vane link shaft 261 and is positioned above the core link shaft 243.

Next, at the stopped state P0, the relative positions and directions of the links are as follows.

The first vane link 250 and the second vane link 260 are disposed in the same direction. The first vane link 250 and the second vane link 260 have an upper end positioned at a front of the discharge direction of air and have a lower end positioned at a rear of the discharge direction of air.

More specifically, the 1-2 vane link shaft 252 of the first vane link 250 is positioned at the front, and the 1-1 vane link shaft 251 of the first vane link 250 is positioned at the rear. The 1-2 vane link shaft 252 of the first vane link 250 is positioned higher than the 1-1 vane link shaft 251. The first vane link 250 is disposed to be inclined downwardly to the rear with respect to the 1-2 vane link shaft 252.

Likewise, the 2-2 vane link shaft part 262 of the second vane link 260 is positioned at the front, and the 2-1 vane link shaft 261 of the second vane link 260 is positioned at the rear. The 2-2 vane link shaft part 262 of the second vane link 260 is positioned higher than the 2-1 vane link shaft 261.

The second vane link 260 is disposed to be inclined downwardly to the rear with respect to the 2-2 vane link shaft 262.

The first drive link body 246 of the drive link 240 is disposed in the same direction as the first vane link 250 and the second vane link 260. The second drive link body 247 crosses with a disposition direction of the first vane link 250 and the second vane link 260.

FIG. 14 is an example drawing of a discharge state P1 of the vane module according to an embodiment. Referring to FIGS. 14 and 19, at the stopped state P0, the discharge state P1 is provided by rotating the drive link 240 in a second direction, that is, a counterclockwise, in the drawing, opposite to the first direction.

In the discharge state P1, the vane module 200 may provide a horizontal wind. The air discharged from the discharge hole 102, by being guided by the first vane 210 and the second vane 220, thereby the horizontal wind, may flow in a horizontal direction with respect to the ceiling or the ground. When the discharged air flows as a horizontal wind, a flow distance of air may be maximized.

In the discharge state P1, upper surfaces of the first vane 210 and second vane 220 may form a continuous surface. In the discharge state P1, the first vane 210 and the second vane 220 connect like one vane, and guide the discharged air.

In this embodiment, the first vane 210 is disposed at the front in the flow direction of the discharged air, the second vane 220 is disposed at the rear in the flow direction of the discharged air. The front end 222a of the second vane 220 may be in close proximity or contact with rear end 212b of the first vane 210. In the discharge state P1, a distance S1 between the front end 222a of the second vane 220 and the rear end 212b of the first vane 210 may be formed to be a minimum.

In the discharge state P1, the front end 222a of the second vane 220 is positioned higher than the rear end 212b of the first vane 210. By bringing the front end 222a and the rear end 212b close or in contact, leakage of discharged air between the first vane 210 and the second vane 220 may be minimized.

In this embodiment, the front end 222a and the rear end 212b are brought in close proximity, but not in contact. When the vane module 200 forms the horizontal wind at the discharge state P1, as the first vane 210 and the second vane 220 are connected and then operate as one vane, a strength of air current of the horizontal wind may be increased. That is, as the discharged air is guided by the upper surface of the second vane 220 and the upper surface of the first vane 210 in the horizontal direction, it is possible to reinforce directionality of the discharged air, compared to forming the horizontal wind by one vane.

When forming the horizontal wind, the second vane 220 is disposed to be inclined, in the upward and downward direction, more than the first vane 210.

In the case of the horizontal wind, when viewed from a lateral side, the first vane 210 is positioned lower than the discharge hole 102, and it is advantageous that the second vane 220 is disposed to overlap with the discharge hole 102.

In the discharge state P1 state, the second vane 220 is rotated in place around the second vane shaft 221, but as the first vane 210 is assembled with the drive link 240 and the first vane link 250, it is swung in the discharge direction of air.

When proceeding from step P0 to P1, the second vane 220 is rotated around the second vane shaft 221, the first vane 210 descends downwardly while advancing in the discharge direction of air, and the front end 212a of the first vane is rotated in the first direction, that is, clockwise, in the drawing.

By rotation of the drive link 240 and the first vane link 250, the first vane 210 may be moved to a lower side of the discharge hole 102, and the first vane 210 may be disposed approximately horizontally. As the vane of the prior indoor unit rotates in place, the disposition like the first vane 210 of this embodiment cannot be realized.

At the stopped state P0, when the vane motor 230 rotates the drive link 240 in the second direction, that is, counterclockwise, the second vane link 260 coupled to the drive link 240 is also rotated to correspond to the drive link 240. More specifically, when changing from the stopped state P0 to the discharge state P1, the drive link 240 is rotated counterclockwise, the first vane link 210 rotates counterclockwise as the drive link 240 rotates, and the second vane link 220 descends while being rotated relatively.

As the second vane 220 is relatively rotatably assembled with the second vane shaft 221 and the second vane link 260, the second vane 220 is rotated clockwise around the second vane shaft 221 by the descent of the second vane link 220.

To form the horizontal wind, when changing from the stopped state P0 to the discharge state P1, directions of rotation of the first vane 210 and the second vane 220 are opposite. At the discharge state P1, the vane motor 230 rotates 73 degrees (P1 rotational angle), the first vane 210 forms a slope (the first vane P1 slope) of approximately 13 degrees, and the second vane 220 forms a slope (the second vane P1 slope) of approximately 52 degrees.

In the discharge state P1, relation of positions of axes forming centers of rotation of each link is as follows.

First, unlike the stopped state P0, the second joint part 217 and the first joint part 216 of the first vane 210 are disposed to be inclined toward the front in the discharge direction of air. When viewed from the lateral side, the third joint part 226 of the second vane 220 is disposed rearmost, the first joint part 216 is disposed foremost, and the second joint part 217 is disposed between the first joint part 216 and the third joint part 226.

At the discharge state P1, the third joint part 226, the second joint part 217, and the first joint part 216 are arranged in a row, and disposition directions thereof face forwardly downwardly the discharge direction of air. According to this embodiment, the third joint part 226, the second joint part 217, and the first joint part 216 may not be arranged in a line.

In addition, in the second vane shaft 221, the third joint part 226, the second joint part 217, and the first joint part 216 may be arranged in a line. In this case, the second vane shaft 221 is positioned at a rear of the third joint part 226.

In the P1 state, the first vane 210 and the second vane 220 provide the horizontal wind. The horizontal wind does not mean that the discharge direction of air is exactly horizontal. The first vane 210 and the second vane 220 are connected as one vane, and by the connection, the horizontal wind means having an angle at which the discharged air flows farthest horizontally.

In the discharge state P1, the distance S1 between the front end 222a of the second vane 220 and the rear end 212b of the first vane 210 may be formed to be the minimum. In the horizontal wind, the air guided by the second vane 220 is guided to the first vane 210. By the P1 state, when the discharged air flows as the horizontal wind, the flow distance of air may be maximized.

As the discharge flow path 104 is formed in the upward and downward direction, a slope of the second vane 220 close to the suction hole 101 is formed to be steeper than a slope of the first vane 210. In the discharge state P1, the 1-1 vane link shaft 251 of the first vane link 250 is positioned below the 1-2 vane link shaft 252. In the discharge state P1, the 2-1 vane link shaft 261 of the second vane link 260 is positioned below the 2-2 vane link shaft part 262.

In the discharge state P1, the first drive link shaft 241 of the drive link 240 is positioned below the second drive link shaft 242 and the core link shaft 243. In the discharge state P1, in the upward and downward direction, the third joint part 226 is positioned at the uppermost, the first joint part 216 is positioned at the lowermost, and the second joint part 217 is positioned therebetween.

In the discharge state P1, the first joint part 216 and the second joint part 217 are positioned between the core link shaft 243 and the 1-2 vane link shaft 252. In the discharge state P1, the first drive link shaft 241 and the 1-1 vane link shaft 251 are positioned under the suction panel 320. In the discharge state P1, the first drive link shaft 241 and the 1-1 vane link shaft 251 are positioned below the discharge hole 102. The 2-1 vane link shaft 261 is positioned across the boundary of the discharge hole 102.

Due to this disposition, in the discharge state P1, the first vane 210 is positioned below the discharge hole 102. In the discharge state P1, the front end 222a of the second vane 220 is positioned under the discharge hole 102, the rear end 222b is positioned above the discharge hole 102.

Next, in the discharge state P1, relative positions and directions of the links are as follows.

A longitudinal direction of the first drive link body 246 is defined as D-D'. A longitudinal direction of the first vane link 250 is defined as L1-L1'. A longitudinal direction of the second vane link 260 is defined as L2-L2'.

In the discharge state P1 state, the first vane link 250, the second vane link 260, and the first drive link body 246 are disposed in the same direction. In this embodiment, the first vane link 250, the second vane link 260, and the first drive link body 246 are all arranged in the upward and downward direction in the discharge state P1.

More specifically, L1-L1' of the first vane link 250 is disposed almost vertically, and L2-L2' of the second vane link 260 is also disposed almost vertically. D-D' of the first drive link body 246 is disposed to face downward in the discharge direction of air.

In the discharge state P1 state, the first vane 210 is positioned under the discharge hole 102, the front end 222a of the second vane 220 is positioned below the discharge hole 102. That is, in the horizontal wind, the second vane 220 is only partially positioned outside of the discharge hole 102, and the first vane 210 is positioned entirely outside of the discharge hole 102.

In the discharge state P1, the front end 212a of the first vane 210 is positioned at the front side of the discharge hole 102 further than a front edge 102a of the discharge hole 102.

When the vane motor 230 operates further in the discharge state P1, a vertical wind may be provided as shown in FIG. 20. The horizontal wind means that the first vane 210 and the second vane 220 is disposed in the upward and downward direction than the discharge state P1.

The vertical wind does not mean that the first vanes 210 and the second vanes 220 constituting the vane module 200 are disposed exactly vertically, but means that air is discharged more vertically than the horizontal wind. When the vane module 200 forms the vertical wind, the first vane 210 and the second vane 220 may be spaced apart to the maximum, and the discharged air may be directly discharged to the floor positioned vertically below by being guided by the first vane 210 and the second vane 220.

In this embodiment, description was made based on the indoor unit of the ceiling-type air conditioner in which four vane modules are disposed, but unlike this embodiment, it is enough that only one or two vane modules are installed in the indoor unit of the ceiling-type air conditioner.

Embodiments have been described above with reference to the accompanying drawings, but as the embodiments are not limited to the above embodiments, embodiments may be manufactured in various different forms, those of ordinary skill in the art to which embodiments pertains will appreciate that embodiments may be practiced in other specific forms without changing the technical idea or essential features. Therefore, it must be understood that the embodiments described above are illustrative and non-limiting in all respects.

The invention claimed is:

1. A ceiling-type indoor unit of an air conditioner, comprising:
   a case in which at least one discharge hole is formed;
   a first vane disposed at the at least one discharge hole;
   a vane motor that is coupled to the case and provides a drive force to the first vane;
   a drive link that is rotatably coupled to the case and coupled with the vane motor and transmits the drive force of the vane motor to the first vane;
   a first vane link rotatably coupled to the case and the first vane;
   a support bracket coupled to the case and disposed at the at least one discharge hole; and
   a support link disposed between a first end and a second end in a longitudinal direction of the first vane and rotatably coupled to the first vane and the support bracket.

2. The ceiling-type indoor unit according to claim 1, further comprising:
   a support bar a first end of which is coupled to the first vane link and a second end of which is coupled to the support link.

3. The ceiling-type indoor unit according to claim 2, wherein the support bar extends in the longitudinal direction of the first vane.

4. The ceiling-type indoor unit according to claim 1, further comprising:
   a support rib that protrudes upwardly from an upper surface of the first vane, wherein the first end of the support link is rotatably coupled to the support rib.

5. The ceiling-type indoor unit according to claim 4, wherein the support rib is disposed between a rear end and a front end of the first vane, with respect to a flow direction of discharged air from the at least one discharge hole.

6. The ceiling-type indoor unit according to claim 4, wherein the support rib extends lengthwise in a flow direction of the discharged air from the at least one discharge hole.

7. The ceiling-type indoor unit according to claim 4, comprising a first side joint rib disposed at a first side of the first vane and to which the first vane link is rotatably coupled, wherein the first side joint rib and the support rib face each other.

8. The ceiling-type indoor unit according to claim 1, wherein a length of the first vane link and a length of the support link are the same.

9. The ceiling-type indoor unit according to claim 8, wherein the support link comprises:
   a first support link body;

a first support link shaft that is disposed below the first support link body and coupled with the support rib, and configured to rotate with respect to the first vane; and
a second support link shaft that is disposed above the first support link body and rotatably coupled to the support bracket.

10. The ceiling-type indoor unit according to claim 9, wherein the first vane link comprises:
a first vane link body;
a 1-1 vane link shaft that is disposed under the first vane link body and coupled with the first vane and configured to rotate with respect to the first vane; and
a 1-2 vane link shaft that is disposed above the first vane link body and coupled with the case and configured to rotate with respect to the case, and wherein the ceiling-type indoor unit further comprises a support bar a first end of which is coupled to the 1-1 vane link shaft and a second end of which is coupled to the first support link shaft.

11. The ceiling-type indoor unit of air conditioner according to claim 1, wherein the case further comprises a link installation portion to a first side surface of which the vane motor is coupled and to a second side surface of which the drive link and the first vane link are coupled, and wherein the second side surface of the link installation portion is exposed to the at least one discharge hole and faces the support bracket.

12. The ceiling-type indoor unit of air conditioner according to claim 1, wherein the support bracket is disposed above a bottom surface of the case, and wherein the support bracket extends lengthwise in a flow direction of discharged air from the at least one discharge hole.

13. The ceiling-type indoor unit of air conditioner according to claim 1, wherein the support bracket is disposed higher than the at least one discharge hole and on a discharge flow path from the suction hole to the at least one discharge hole.

14. The ceiling-type indoor unit of air conditioner according to claim 1, further comprising:
a second vane that is disposed at the at least one discharge hole and rotatably coupled to the case;
a second vane link that is rotatably coupled to the drive link and the second vane, respectively, wherein the second vane is disposed lower than the support bracket.

15. The ceiling-type indoor unit according to claim 14, further comprising:
a bracket avoidance groove formed at the support bracket and concave upwardly from a lower side of the support bracket, wherein at least a portion of the second vane is inserted into the bracket avoidance groove, when the second vane operates.

16. The ceiling-type indoor unit according to claim 1, wherein the drive link comprises a first side drive link disposed at a first side of the at least one discharge hole and a second side drive link disposed at a second side of the at least one discharge hole, wherein the first vane link comprises a first side first vane link disposed at the first side of the at least one discharge hole and a second side first vane link disposed at the second side of the at least one discharge hole, wherein the support link comprises a first support bracket disposed close to the first side between the first side and the second side of the at least one discharge hole and a second support bracket disposed close to the second side, wherein the support link comprises a first support link rotatably with coupled to the first vane and the first support bracket and a second support link rotatably with coupled to the first vane and the second support bracket.

17. The ceiling-type indoor unit according to claim 16, further comprising:
a first support bar coupled to the first side first vane link and the first support link; and
a second support bar coupled to the second side first vane link and the second support link.

18. The ceiling-type indoor unit according to claim 17, wherein the first support bar and the second support bar are arranged in a line.

19. The ceiling-type indoor unit according to claim 17, wherein the first support bar and the second support bar are disposed at a same height with respect to the first vane.

20. The ceiling-type indoor unit according to claim 17, wherein the first support bar is disposed in front of the first side drive link, and the second support bar is disposed in front of the second side drive link.

21. A ceiling-type indoor unit of an air conditioner, comprising:
a case in which a plurality of discharge holes is formed;
a first vane disposed at each of the plurality of discharge holes;
a vane motor that is coupled to the case and provides a drive force to the first vane;
a drive link that is rotatably coupled to the case and coupled with the vane motor and transmits the drive force of the vane motor to the first vane;
a first vane link rotatably coupled to the case and the first vane;
a support bracket coupled to the case and disposed at each of the plurality of discharge holes;
a support link disposed between a first end and a second end in a longitudinal direction of the first vane and rotatably coupled to the first vane and the support bracket; and
a support bar a first end of which is coupled to the first vane link and a second end of which is coupled to the support link, wherein the support bar extends in the longitudinal direction of the first vane.

22. A ceiling-type indoor unit of an air conditioner, comprising:
a case in which a plurality of discharge holes is formed;
a first vane disposed at each of the plurality of discharge holes;
a vane motor that is coupled to the case and provides a drive force to the first vane;
a drive link that is rotatably coupled to the case and coupled with the vane motor and transmits the drive force of the vane motor to the first vane;
a first vane link rotatably coupled to the case and the first vane;
a support bracket coupled to the case and disposed at each of the plurality of discharge holes;
a support link disposed between a first end and a second end in a longitudinal direction of the first vane and rotatably coupled to the first vane and the support bracket;
a second vane that is disposed at each of the plurality of discharge holes and rotatably coupled to the case; and
a second vane link that is rotatably coupled to the drive link and the second vane, respectively, wherein the second vane is disposed lower than the support bracket.

* * * * *